US010712938B2

(12) United States Patent
Kim et al.

(10) Patent No.: US 10,712,938 B2
(45) Date of Patent: Jul. 14, 2020

(54) PORTABLE DEVICE AND SCREEN DISPLAY METHOD OF PORTABLE DEVICE

(71) Applicant: Samsung Electronics Co., Ltd., Gyeonggi-do (KR)

(72) Inventors: Gae-Youn Kim, Gyeonggi-do (KR); Do-Hyung Lee, Gyeonggi-do (KR); Sae-Rom Lee, Seoul (KR); Byung-Jin Kang, Seoul (KR); Seong-Woong Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 129 days.

(21) Appl. No.: 15/291,701

(22) Filed: Oct. 12, 2016

(65) Prior Publication Data
US 2017/0102872 A1 Apr. 13, 2017

(30) Foreign Application Priority Data
Oct. 12, 2015 (KR) .......................... 10-2015-0142459

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 1/1643* (2013.01); *G06F 1/1652* (2013.01);
(Continued)

(58) Field of Classification Search
CPC .. G06F 3/0482; G06F 3/04886; G06F 3/0488; G06F 3/0481; G06F 3/04842;
(Continued)

(56) References Cited

U.S. PATENT DOCUMENTS 9,001,149 B2 * 4/2015 Sirpal ................... G06F 1/1616
   345/619
9,426,519 B1 * 8/2016 Lewis .................. H04N 21/435
(Continued)

FOREIGN PATENT DOCUMENTS

EP        2 916 195       9/2015
KR   10-2013-0127050    11/2013
(Continued)

OTHER PUBLICATIONS

"HTC EVO 3D", published: 2011, publisher: Sprint, pp. 155 (Year: 2011).*

(Continued)

*Primary Examiner* — Wilson W Tsui
(74) *Attorney, Agent, or Firm* — The Farrell Law Firm, P.C.

(57) ABSTRACT

Provided are a portable device and a screen display method of a portable device. The portable device includes an edge touch screen that has a main display area, has a left edge display area and a right edge display area which are individually extended from the main display area, and configured to display an application screen thereon; and a controller configured to control the edge touch screen, a first application screen corresponding to a first user input to be displayed on the edge touch screen, a second application screen corresponding to a second user input to be displayed in the main display area, and a part of the first application screen to be displayed in the left edge display area or the right edge display area.

19 Claims, 15 Drawing Sheets

(51) Int. Cl.
*G06F 1/16* (2006.01)
*H04M 1/725* (2006.01)
*H04M 1/02* (2006.01)

(52) U.S. Cl.
CPC .... *G06F 3/04883* (2013.01); *H04M 1/72522* (2013.01); *H04M 1/0268* (2013.01); *H04M 2250/22* (2013.01)

(58) Field of Classification Search
CPC .... G06F 3/041; G06F 3/0483; G06F 3/04847; G06F 3/0485; G06F 2203/04803; G06F 3/04817; G06F 3/017; G06F 3/0486; G06F 3/0416
See application file for complete search history.

(56) References Cited

U.S. PATENT DOCUMENTS

| | | | | |
|---|---|---|---|---|
| 9,965,165 | B2* | 5/2018 | Hinckley | G06F 3/0488 |
| 2011/0131531 | A1* | 6/2011 | Russell | G06F 3/0482 |
| | | | | 715/835 |
| 2012/0188281 | A1* | 7/2012 | Nishina | G01C 21/20 |
| | | | | 345/634 |
| 2012/0304107 | A1* | 11/2012 | Nan | G06F 3/04883 |
| | | | | 715/781 |
| 2012/0306788 | A1* | 12/2012 | Chen | G06F 3/0482 |
| | | | | 345/173 |
| 2013/0088450 | A1* | 4/2013 | Takase | G06F 3/0485 |
| | | | | 345/173 |
| 2013/0178248 | A1 | 7/2013 | Kim | |
| 2013/0227413 | A1* | 8/2013 | Thorsander | G06F 3/0482 |
| | | | | 715/716 |
| 2013/0300697 | A1* | 11/2013 | Kim | G06F 1/1626 |
| | | | | 345/173 |
| 2013/0321264 | A1* | 12/2013 | Park | G06F 3/01 |
| | | | | 345/156 |
| 2014/0123080 | A1* | 5/2014 | Gan | G06F 3/0481 |
| | | | | 715/863 |
| 2014/0240289 | A1 | 8/2014 | Myers et al. | |
| 2014/0267091 | A1* | 9/2014 | Kim | G06F 1/1652 |
| | | | | 345/173 |
| 2014/0267097 | A1 | 9/2014 | Lee et al. | |
| 2014/0298257 | A1* | 10/2014 | Grandhi | G06F 3/0484 |
| | | | | 715/808 |
| 2015/0015513 | A1 | 1/2015 | Kwak et al. | |

FOREIGN PATENT DOCUMENTS

| | | |
|---|---|---|
| KR | 1020140113178 | 9/2014 |
| WO | WO 2015/016628 | 2/2015 |

OTHER PUBLICATIONS

International Search Report dated Jan. 20, 2017 issued in counterpart application No. PCT/KR2016/011432, 12 pages.
European Search Report dated Sep. 10, 2018 issued in counterpart application No. 16855711.4-1221, 8 pages.

* cited by examiner

PORTABLE DEVICE AND SCREEN DISPLAY METHOD OF PORTABLE DEVICE

PRIORITY

This application claims priority under 35 U.S.C. § 119(a) to a Korean Patent Application filed on Oct. 12, 2015 in the Korean Intellectual Property Office and assigned Serial No. 10-2015-0142459, the entire content of which is incorporated herein by reference.

BACKGROUND

1. Field of the Disclosure

The present disclosure relates generally to a portable device and a screen display method of a portable device and, more particularly, to a portable device that displays an application screen using an edge touch screen and a screen display method of a portable device.

2. Description of the Related Art

Recent portable devices provide not only a call function and data transmission but also various services and functions like multitasking. In addition, portable devices may have not only a flat touch screen but also an edge touch screen having a curvature on the side of a flat screen.

A portable device in which multiple applications are executed through multitasking displays a screen of one application in a display unit. A user may identify an application, or app, that has been previously executed by selecting a previously executed app button.

Since a screen of an application currently being executed is provided only to a user, the user has to select a previously executed app button in order to switch the screen to that of the previously executed application. Thus, it is inconvenient to intuitively perform a screen switch from the screen of an application currently being executed to that of a previously executed application.

SUMMARY

An aspect of the present disclosure provides a portable device and a screen display method of a portable device may be provided, the portable device capable of displaying a screen of an application currently being executed in a main display area and displaying a screen of a previously executed application in an edge display area.

An aspect of the present disclosure provides a controller that may control a third application screen corresponding to a third user input to be displayed on an edge touch screen, and control a part of a second application screen and a part of a first application screen to be displayed in edge display areas.

An aspect of the present disclosure provides a controller that may perform a control such that successive motions of a first touch from an active area of edge display areas to a main display area are detected, and an application drawer corresponding to successive motions of the first touch is displayed.

An aspect of the present disclosure provides a controller that may perform a control such that successive motions of a second touch from an inactive area of edge display areas to a main display area are detected, and an edge panel corresponding to successive motions of the second touch is displayed.

An aspect of the present disclosure provides a portable device that can display a currently executed application screen in a main display area and display a previously executed application screen in an edge display area, and a screen display method of a portable device may be provided.

An aspect of the present disclosure provides a portable device that can display a currently executed application screen in a main display area and display a plurality of previously executed application screens in edge display areas, and a screen display method of a portable device may be provided.

An aspect of the present disclosure provides a portable device that can display a currently executed application screen in a main display area, display a plurality of previously executed application screens in edge display areas, and display an application drawer in response to successive motions of a touch detected in an active area of the edge display areas, and a screen display method of a portable device may be provided.

An aspect of the present disclosure provides a portable device that can display a currently executed application screen in a main display area, display a plurality of previously executed application screens in edge display areas, and display an edge panel in response to successive motions of a touch detected in an inactive area of the edge display areas, and a screen display method of a portable device may be provided.

An aspect of the present disclosure provides a portable device that can display one of an application screen, an application drawer, and an edge panel, using a main display area and an edge display area, and a screen changing method of a portable device may be provided.

In accordance with an aspect of the present disclosure, a portable device is provided. The portable device includes an edge touch screen that has a main display area, has a left edge display area and a right edge display area which are individually extended from the main display area, and configured to display an application screen thereon; and a controller configured to control the edge touch screen, a first application screen corresponding to a first user input to be displayed on the edge touch screen, a second application screen corresponding to a second user input to be displayed in the main display area, and a part of the first application screen to be displayed in the left edge display area or the right edge display area.

In accordance with an aspect of the present disclosure, a screen display method of a portable device is provided. The screen display method of a portable device includes detecting, by the portable device, a first user input in an edge touch screen that has a main display area, has a left edge display area and a right edge display area which are individually extended from the main display area, and displays an application screen thereon; displaying, by the portable device, a first application screen corresponding to the detected first user input in the edge touch screen; detecting, by the portable device, a second user input; and displaying, by the portable device, a second application screen corresponding to the detected second user input in the main display area of the edge touch screen, wherein the first application screen is displayed in the left edge display area or the right edge display area in response to the display of the second application screen in the main display area.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
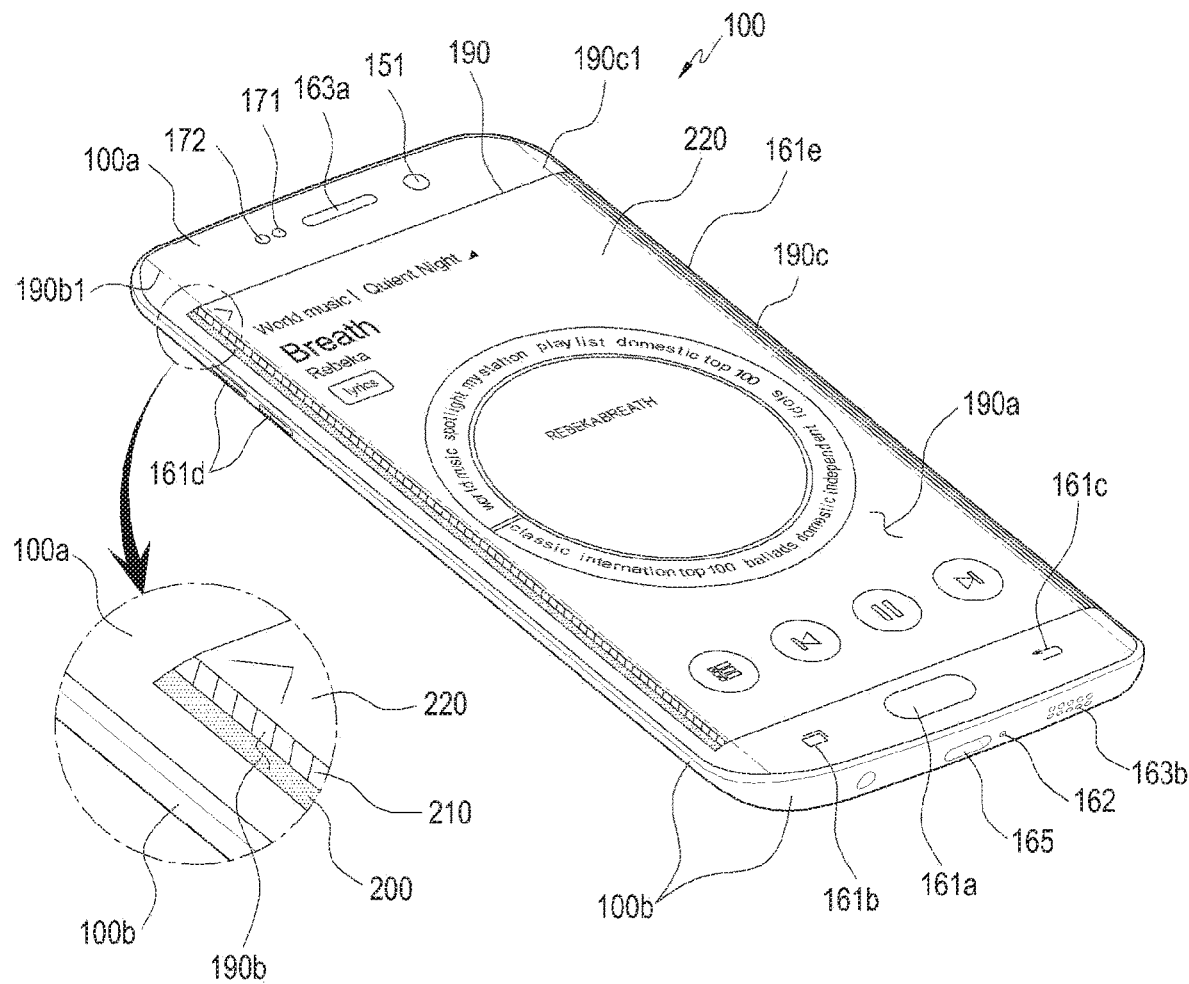
FIG. 1 is a front perspective view of a portable device according to an embodiment of the present disclosure.

Hereinafter, exemplary embodiments of the present disclosure are described below with reference to the accompanying drawings. Further, methods of manufacturing using the present disclosure are described below in detail with reference to the accompanying drawings. The same reference numerals or the signs represented in each of the drawings indicate the elements or the components that perform substantially the same functions.

Ordinal terms such as "first" and "second" may be used to describe various elements, but these elements are not limited by the terms. The above terms may be used to distinguish one element from another element. For example, a first element may be referred to as a second element in the present disclosure. Further, a second element may be referred to as a first element. As used herein, the term "and/or" includes any and all combinations of one or more disclosed items.

An application according to an embodiment of the present disclosure refers to a computer operating system (OS) or software executed on a mobile OS and used by a user. For example, the application may include a web browser, a mobile payment application, a photo album application, a word processor, a spread sheet, a contact application, a calendar application, a memo application, an alarm application, a social network system (SNS) application, a game store, a chat application, a map application, a music player, a video player, or the like.

An application according to an embodiment of the present disclosure may refer to software executed by a portable device or an external device (for example, a server) connected to the portable device wirelessly or through a wire. Further, an application according to an embodiment of the present disclosure may refer to software to be executed in a portable device in response to a received user input.

Content may be displayed in an executed application. For example, content may include a video file or an audio file reproduced in a video player that is one of a plurality of applications, a music file reproduced in a music player, a photo file displayed in a photo album application, a web page file displayed in a web browser, or payment information (for example, a mobile card number) transmitted by a mobile payment application. Further, payment information may include encrypted temporary token information.

Content may include a video file, an audio file, a text file, an image file, or a webpage displayed or executed in an application.

In an embodiment of the present disclosure, the term "video" may indicate a dynamic image. Further, content may include a video file, an audio file, a text file, an image file, or a webpage displayed or executed in response to a received user input.

Content may include an application screen and a user interface that configures the application screen. Further, content may include a content or a plurality of contents.

A widget refers to a mini application, which is one of a plurality of graphical user interfaces (GUIs) that more smoothly support an interaction between a user and an application or OS. For example, a widget may include a weather widget, a calculator widget, and a clock widget.

In an embodiment of the present disclosure, the term "user input" may indicate, for example, a button (or key) selection by a user, a button (or key) press by a user, a button touch by a user, a touch by a user, a touch gesture by a user, a user's voice, a presence of a user (for example, a user appears within the range of camera recognition), or a user's motion. Further, the phrase "selection of a button (or key)" may refer to a pressing of a button (or key) or a touching a button (or key).

In the present disclosure, the terms are used to describe an embodiment, and are not intended to limit and/or restrict the present disclosure. As used herein, singular forms are intended to include plural forms as well, unless the context clearly indicates otherwise. In the present disclosure, the terms "include" and "have" indicate the existence of a feature, a number, a step, an operation, a structural element, parts, or a combination thereof, but do not exclude the existence or the addition of one or more other features, numeral, steps, operations, structural elements, parts, or combinations thereof. The same reference numerals represented in each of the drawings indicate the elements that perform substantially the same functions.

FIG. 1 is a front perspective view of a portable device 100 according to an embodiment of the present disclosure.

Referring to FIG. 1, an edge touch screen 190 is located in a center area of a front surface 100a of the portable device 100. The edge touch screen 190 may include a flexible display panel. The edge touch screen 190 may include a curved touch panel corresponding to a curved display panel. A detailed description of the edge touch screen 190 is provided below.

The edge touch screen 190 may be formed through a thin flexible printed circuit board and may be curved or bent. The edge touch screen 190 may include a main touch screen 190a, a first edge touch screen 190b, and a second edge touch screen 190c (as described below in more detail with reference to FIGS. 3A to 3D). In the edge touch screen 190, the main touch screen 190a and edge touch screens 190b, 190c on both sides may be integratedly formed.

The edge touch screen 190 may include one of the main touch screen 190a and a first edge touch screen (one of the edge touch screens 190b, 190c). The main touch screen 190a and the first edge touch screen (one of the edge touch screens 190b, 190c) on one side may be integratedly formed.

FIG. 1 illustrates an embodiment of the present disclosure in which an application screen (for example, a music player 220) is displayed on the edge touch screen 190. The edge touch screen 190 may display a plurality of home screens. The home screens may display a shortcut icon corresponding to an application that may be selected by touch (or including non-contact hovering), a weather widget, and/or a clock widget.

A status bar which displays a status of the portable device 100 such as a battery charging status, an intensity of a received signal, and a current time may be displayed on the upper portion of the home screen. Further, the home screen of the portable device 100 may be located below the status bar. Further, the status bar may not be displayed but only the home screen may be displayed.

A first camera 151, a speaker 163*a*, a proximity sensor 171, and an illuminance sensor 172 may be located on the upper portion of the front surface 100*a* of the portable device 100. A second camera 152 and a flash 153 (as described below in more detail with reference to FIG. 2) may be located on a rear surface of the portable device 100.

A home button 161*a*, a recently executed app button 161*b*, and a back button 161*c* may be located on the lower portion of the front surface 100*a* of the portable device 100. The home button 161*a* to the back button 161*c* may be implemented in the form of a touch button as well as a physical button. Further, the home button 161*a* to the back button 161*c* may be displayed with text or another icon within the edge touch screen 190.

A power/lock button and a volume button 161*d* may be located on a side surface of the portable device 100. The side surface of the portable device 100 may connect the front surface 100*a* and the rear surface of the portable device 100. The side surface of the portable device 100 may include a left side surface, a right side surface, an upper portion, and a lower portion.

A microphone 162, a speaker 163*b*, and/or a connector 165 may be located on the lower portion of the portable device 100. An insertion hole into which an input pen 167 (as described below in more detail with reference to FIG. 2) having a button may be inserted may be located on the lower portion of the portable device 100. The input pen 167 may be stored within the portable device 100 through the insertion hole and removed from the portable device 100 to be used.

FIG. 1 illustrates an example of an embodiment of the present disclosure in which a third application (for example, a music player application) screen 220 executed by a user input is displayed on the edge touch screen 190.

A part of a second application screen 210 may be displayed under the third application screen 220 displayed on the main display area 190*a*, and a part of a first application screen 200 may be displayed under the second application screen 210. A part of the second application screen 210 may be displayed on the first edge touch screen 190*b* and the second edge touch screen 190*c* located on the side surface of the main display area 190*a*, and a part of the first application screen 200 may be displayed under the second application screen 210.

A part of the second application screen 210 may be displayed on the first edge touch screen 190*b* and the second edge touch screen 190*c* located on the side surface of the main display area 190*a*, and a part of the first application screen 200 may be displayed to be spaced under the second application screen 210. For example, the edges of two neighboring screens among the first to third application screens 200, 210, 220 may be spaced apart from each other by a 40 pixel distance. The distance may vary according to the size of the edge touch screen 190*b* or 190*c* (for example, the distance between 190*b*1 and 190*b*2, as described below in more detail with reference to FIG. 3A).

Figure 2:
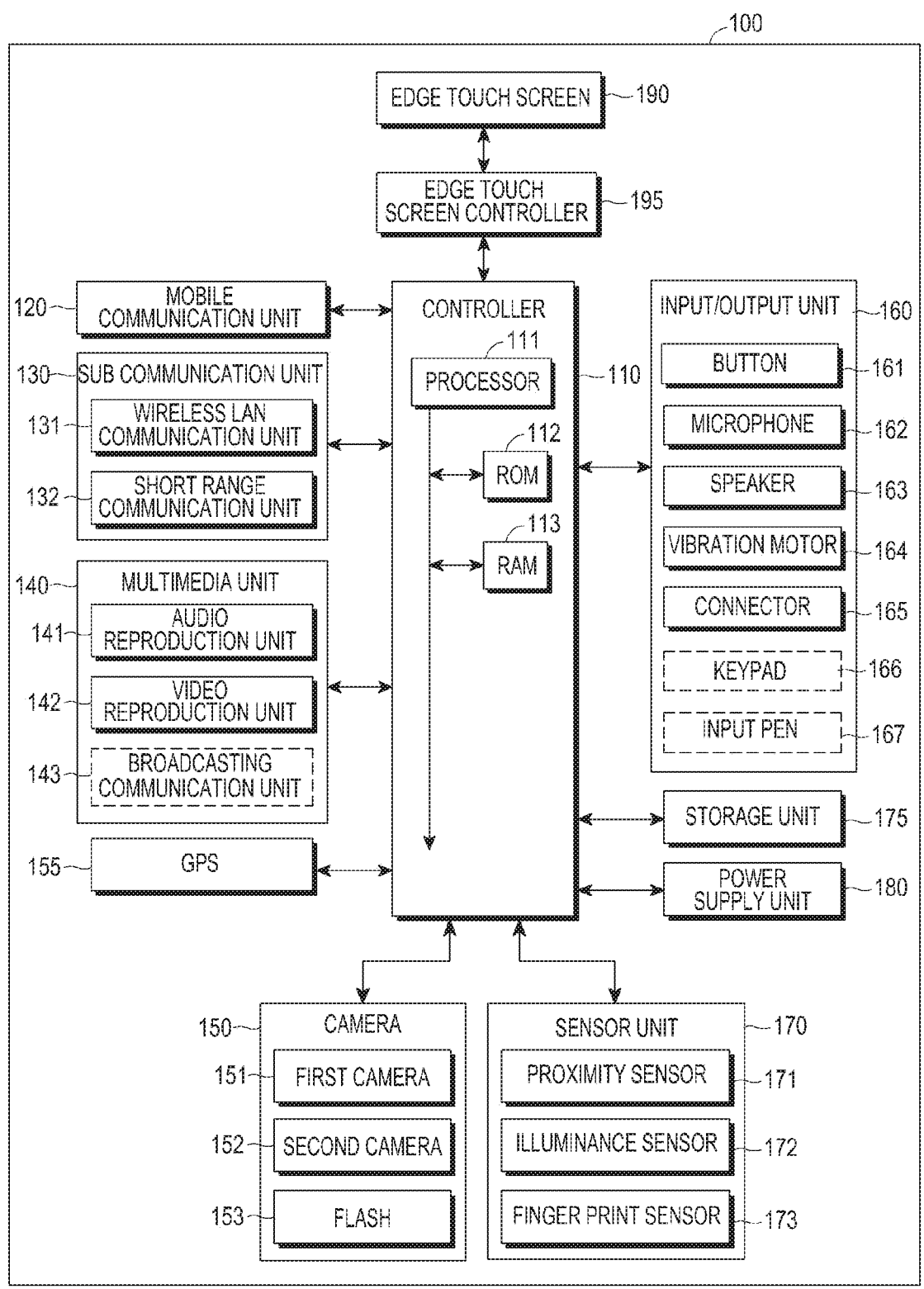
FIG. 2 is a block diagram of a portable device according to an embodiment of the present disclosure.

FIG. 2 is a block diagram of a portable device 100 according to an embodiment of the present disclosure.

Referring to FIG. 2, the portable device 100 may be connected to another device (for example, a wearable device or a server) by using a mobile communication unit 120, a sub communication unit 130, and a connector 165 through a wired cable or wirelessly. For example, the portable device 100 may include a cellular phone, a smart phone, a tablet computer device, a moving picture experts group audio layer 3 (MP3) player, a video player, an electronic blackboard, a monitor, an electronic device having a display (for example, a refrigerator, a washing machine, an air-conditioner, or the like), a display device, or the like.

The display device may be implemented by an analog TV, a digital TV, a 3D-TV, a smart TV, an light emitting diode (LED) TV, an organic LED (OLED) TV, a plasma TV, a curved TV having a fixed curvature screen, a flexible TV having a fixed curvature screen, a bent TV having a fixed curvature screen, and/or a curvature variable TV having a screen curvature which may be changed by a received user input, but the display device of the present disclosure is not limited thereto.

The portable device 100 may transmit or receive data (for example, data corresponding to a content) by the edge touch screen 190 to or from the outside through the communication unit 120 or the sub communication unit 130. The portable device 100 may transmit or receive data (for example, data corresponding to a content) by the input pen 167 and the edge touch screen 190 to or from the outside through the communication unit 120 or the sub communication unit 130. The portable device 100 may transmit or receive data (for example, corresponding to a content) to or from the outside in accordance with an interaction (for example, a touch or a touch gesture) input into the edge touch screen 190. Further, the portable device 100 may transmit or receive data (for example, corresponding to a content) to or from the outside through the communication unit 120 or 130, using an edge display unit (for example, an embodiment of the present disclosure having only an edge display panel without an edge touch panel).

The portable device 100 may include a controller 110, the mobile communication unit 120, the sub communication unit 130, a multimedia unit 140, a camera 150, a global positioning system (GPS) 155, an input/output unit 160, a sensor unit 170, a storage unit 175, and a power supply unit 180. Further, the portable device 100 may include the edge touch screen 190 and an edge touch screen controller 195.

The controller 110 may include a processor 111. The controller 110 may further include a read only memory (ROM) 112 which stores a control program for controlling the portable device 100, and a random access memory (RAM) 113 which stores signals or data input from the outside of the portable device 100, or is used as a storage region for various tasks performed by the portable device 100.

The controller 110 controls the general operation of the portable device 100 and a signal flow between internal elements 120 to 195 and processes data. The controller 110 controls power supplied to internal elements 120 to 195, using the power supply unit 180.

The processor 111 may include a graphics processing unit (GPU) for graphic processing. Further, the processor 111 may include a sensor processor that controls a sensor, or a communication processor that controls communication.

The processor 111 may be implemented in a system on chip (SoC) form including a core and a GPU. The processor 111 may include a single core, a dual core, a triple core, a quadruple core, and a core of a multiple thereof. Further, the processor 111, the ROM 112, and the RAM 113 may be connected to each other through buses.

The controller 110 may control the mobile communication unit 120, the sub communication unit 130, the multimedia unit 140, the camera 150, the GPS 155, the input/output unit 160, the sensor unit 170, the storage unit 175, the power supply unit 180, the touch screen 190, and the edge touch screen controller 195.

The controller 110, according to an embodiment of the present disclosure, controls an edge touch screen that has a main display area, a left edge display area and a right edge display area which individually extend from the main display area, and displays an application screen thereon; controls a first application screen corresponding to a first user input to be displayed on the edge touch screen; controls a second application screen corresponding to a second user input to be displayed in the main display area; and controls a part of the first application screen to be displayed in the edge display areas.

The controller 110 may perform a control such that a part of the first application screen including an edge area of the application screen is displayed.

The controller 110 may perform a control such that an area of a second application screen is displayed to be less than an area of a first application screen.

The controller 110 may control a third application screen corresponding to a third user input to be displayed on the edge touch screen, and control a part of the second application screen and a part of the first application screen to be displayed in the edge display areas.

The controller 110 may perform a control such that the second application screen is located on the first application screen, and the third application screen is displayed on the second application screen.

The controller 110 may perform a control such that the area of the third application screen is displayed to be less than the area of the first application screen.

The controller 110 may perform a control such that successive motions of a first touch from an active area of the edge display areas to the main display area are detected, and an application drawer corresponding to successive motions of the first touch is displayed.

The controller 110 may control the application drawer to be exposed in a direction from an edge of the edge display areas in which the first touch is detected towards a moving direction of successive motions of the first touch.

The controller 110 may control the application drawer to be further exposed in response to a moving distance of successive motions of the first touch.

The controller 110 may perform a control such that the third application screen and the application drawer are displayed as overlapping, and only the application drawer moves in a moving direction of successive motions of the first touch in response to a moving distance of successive motions of the first touch.

The controller 110 may perform a control such that successive motions of a second touch from an inactive area of the edge display areas to the main display area are detected, and an edge panel corresponding to successive motions of the second touch is displayed.

The controller 110 may control the edge panel to be exposed in a direction from an edge of the edge display areas in which the second touch is detected towards a moving direction of successive motions of the second touch.

The controller 110 may control the edge panel and the third application screen to move in a moving direction of successive motions of the second touch.

The controller 110 may perform a control such that the exposed area of the edge panel is increased in response to a moving distance of successive motions of the second touch, and the exposed area of the third application screen is decreased.

When movement of the edge panel is completed in response to successive motions of the second touch and the third application screen continuously moves, the controller 110 may perform a control such that a part of the second application screen is displayed between the third application screen and the edge panel.

The controller 110 may perform a control such that at least one of visual feedback, audible feedback, or tactile feedback is provided to a user, in response to displaying the application drawer.

The controller 110 may perform a control such that at least one of visual feedback, audible feedback, and tactile feedback is provided to a user, in response to a display of the edge panel.

According to an embodiment of the present disclosure, the term "controller" may include the processor 111, the ROM 112, and the RAM 113.

The mobile communication unit 120 may be connected to another device (for example, another portable device, a wearable device, or a server) through a mobile communication network by using one or more antennas under control of the controller 110. The mobile communication unit 120 may receive, from another device, biometric information and/or data (or content) under control of the controller 110. The received biometric information and/or data (or content) may be stored in the storage unit 175 under control of the controller 110.

The sub communication unit 130 may be connected to another device (for example, another portable device, a wearable device, or a server) through a wireless local area network (WLAN) communication unit 131 and/or a short range communication unit 132 under control of the controller 110. The sub communication unit 130 may transmit or receive biometric information and/or data (or content) to or from another device under control of the controller 110. The biometric information and/or data (or content) may be stored in the storage unit 175 under control of the controller 110.

The WLAN communication unit 131 may be wirelessly connected to an access point (AP) in a place where the AP is installed under control of the controller 110. The WLAN communication unit 131 may include, for example, wireless fidelity (Wi-Fi). The WLAN module 131 supports a WLAN standard (IEEE802.11x) of the Institute of Electrical and Electronics Engineers (IEEE).

Short range communication may include Bluetooth, Bluetooth low energy, a standard of the Infrared Data Association (IrDA), ultra-wideband (UWB), magnetic secure transmission (MST), and/or near field communication (NFC).

An MST scheme may generate a magnetic field signal corresponding to payment information (for example, mobile card information, etc.) through a coil antenna and transmit the same to a point of sale (POS) device.

The portable device 100 may include one of the mobile communication unit 120, the WLAN communication unit 131, the short range communication unit 132, or a combination of the mobile communication unit 120, the WLAN communication unit 131, and the short range communication unit 132 according to a function and/or performance. The portable device 100 may be connected to various external accessories (for example, a wireless speaker, a wireless headset, etc.) using one of the mobile communication unit 120 and a sub communication unit 130.

According to an embodiment of the present disclosure, the term "communication unit" includes the mobile communication unit 120 and/or the sub communication unit 130.

The multimedia unit 140 may receive an external broadcast and reproduce audio data and/or a video under control of the controller 110. The multimedia unit 140 may include an audio reproduction unit 141, a video reproduction unit 142, and/or a broadcasting communication unit 143.

The audio reproduction unit 141 may reproduce an audio source (for example, an audio file including file extensions such as mp3, wma, ogg, or way) pre-stored in the storage unit 175 of the portable device 100 or received externally under a control of the controller 110.

According to an embodiment of the present disclosure, the audio reproduction unit 141 may reproduce audible feedback which corresponds to switching to another screen corresponding to mobile payment according to a touch gesture input to the edge touch screen 190. For example, the audio reproduction unit 141 may reproduce audible feedback (for example, output of an audio source stored in the storage unit 175) corresponding to switching to another screen corresponding to mobile payment according to a touch gesture input to the edge touch screen 190 under a control of the controller 110.

According to an embodiment of the present disclosure, the audio reproduction unit 141 may reproduce audible feedback (for example, an output of an audio source stored in the storage unit 175) corresponding to one of display of the application drawer (e.g. an application drawer 310 described in more detail below with reference to FIG. 5F) and display of the edge panel (e.g. an edge panel 320 described in more detail below with reference to FIG. 5I) under control of the controller 110.

The video reproduction unit 142 may reproduce a digital video source (for example, a video file including file extensions such as mpeg, mpg, mp4, avi, mov, or mkv) pre-stored in the storage unit 175 of the portable device 100 or received externally by using a video coder-decoder (CODEC) under control of the controller 110.

A multimedia application which may be installed in the portable device 100 may reproduce an audio source or a video source by using an audio CODEC and/or video CODEC. Further, the multimedia application, which may be installed in the portable device 100, may reproduce the video source by using a hardware CODEC and/or a software CODEC.

According to an embodiment of the present disclosure, the video reproduction unit 142 may reproduce visual feedback which corresponds to switching to another screen corresponding to one of display of the application drawer 310 and display of the edge panel 320. For example, the visual feedback (for example, an output of a video source stored in the storage unit 175) may be reproduced through the video CODEC under control of the controller 110.

The broadcasting communication unit 143 may receive a broadcasting signal (for example, a TV broadcasting signal, a radio broadcasting signal, or a data broadcasting signal) and broadcasting supplement information (for example, an electronic program guide (EPG) or an electronic service guide (ESG)) output from an external broadcasting station through an antenna under control of the controller 110. Further, the controller 110 may perform a control to reproduce a received broadcasting signal and broadcasting supplement information by using a touch screen, a video CODEC, or an audio CODEC.

The multimedia unit 140 may include the audio reproduction unit 141 and the video reproduction unit 142 but not the broadcasting communication unit 143 in accordance with the performance or structure of the portable device 100. Further, the controller 110 may be implemented to include the audio reproduction unit 141 or the video reproduction unit 142 of the multimedia unit 140.

According to an embodiment of the present disclosure, the term "audio CODEC" may include one or more audio CODECs, and the term "video CODEC" may include one or more video CODECs.

The camera 150 may be used to photograph a still image or record a video under control of the controller 110. The camera 150 may include one of the first camera 151 on the front surface 100a of the portable device 100 and the second camera 152 on the rear surface of the portable device 100. For example, the camera 150 may include one of the first camera 151 and the second camera 152 or both the first camera 151 and the second camera 152. Further, the first camera 151 and the second camera 152 may each include an auxiliary light source (for example, a flash 153) providing an amount of light required for photography.

The camera 150 may be implemented to include the first camera 151 on the front surface of the portable device 100 and to further include an additional camera (for example, a third camera) adjacent to the first camera 151. For example, an interval between the third camera and the first camera 151 may be greater than 5 mm but less than 80 mm. When the camera 150 further includes the third camera, the controller 110 may photograph a still image in three-dimensions (3D) or record a video in 3D by using the first camera 151 and the third camera.

The camera 150 may be implemented to include the second camera 152 on the rear surface of the portable device 100 and to further include an additional camera (for example, a fourth camera) adjacent to the second camera 152. For example, an interval between the fourth camera and the second camera 152 may be greater than 5 mm but less than 80 mm. When the camera 150 further includes the fourth camera, the controller 110 may photograph a three-dimensional still image or a three-dimensional video by using the second camera 152 and the fourth camera.

Further, the first camera 151 and the second 152 may each perform wide angle photography, telephoto photography, and close-up photography by using an additional lens attachable to/detachable from a separate adaptor.

The GPS 155 may periodically receive a signal (for example, orbit information of a GPS satellite, time information of a satellite, and a navigation message) from each of a plurality of GPS satellites orbiting the Earth.

In a case of being outdoors, the portable device 100 may calculate locations of a plurality of GPS satellites and the portable device 100 by using signals received from the plurality of GPS satellites (not shown) and calculate a distance therebetween by using a transmission/reception time difference. A location, time, or movement speed of the portable device 100 may be calculated through triangulation. An additional GPS satellite may be required to compensate for the orbit or the time.

In a case of being indoors, the portable device 100 may detect a location or a movement speed of the portable device 100 by using a wireless AP. A method of detecting a location of the portable device 100 indoors may use a cell identifier (ID) scheme using an ID of a wireless AP, an enhanced cell ID scheme using the ID of the wireless AP and a received signal strength (RSS), or an angle of arrival (AoA) scheme using an angle of a signal transmitted from the AP and received by the portable device 100.

Further, the portable device 100 may detect the location or movement speed of the portable device 100 located indoors by using a wireless beacon. An indoor location of the portable device 100 may be detected through various methods in addition to the method described above.

The input/output unit 160 may include at least one of one or more buttons 161, one or more microphones 162, one or more speakers 163, one or more vibration motors 164, a connector 165, a keypad 166, and the input pen 167.

Figure 5A:
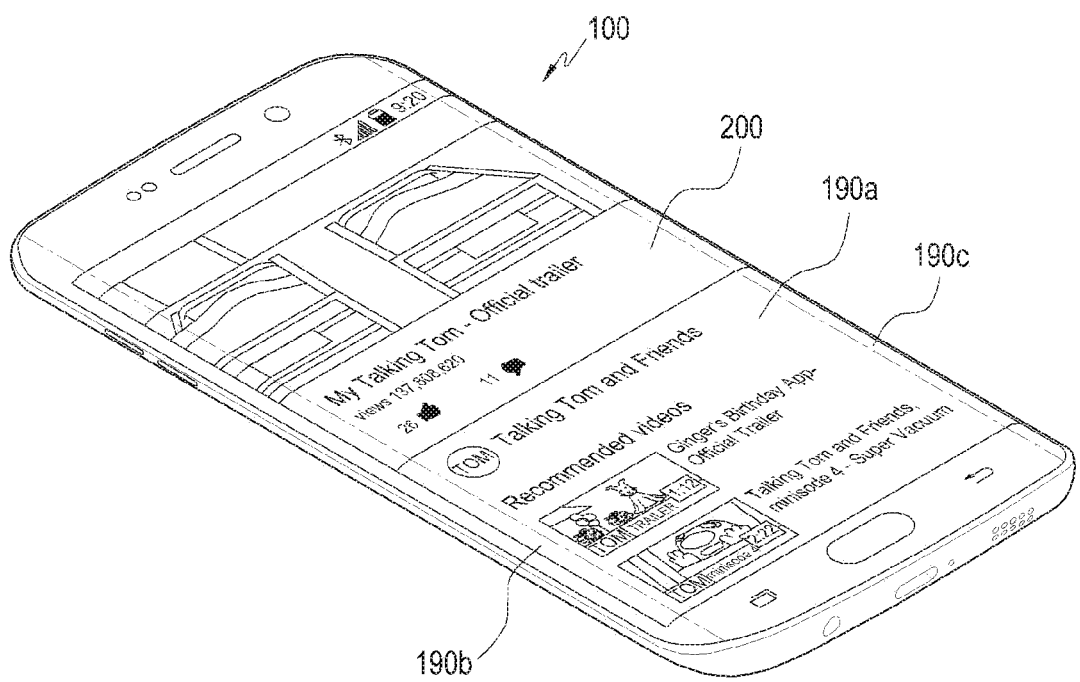
FIGS. 5A to 5J are diagrams of a screen of an electronic device according to an embodiment of the present disclosure.
Figure 5B:
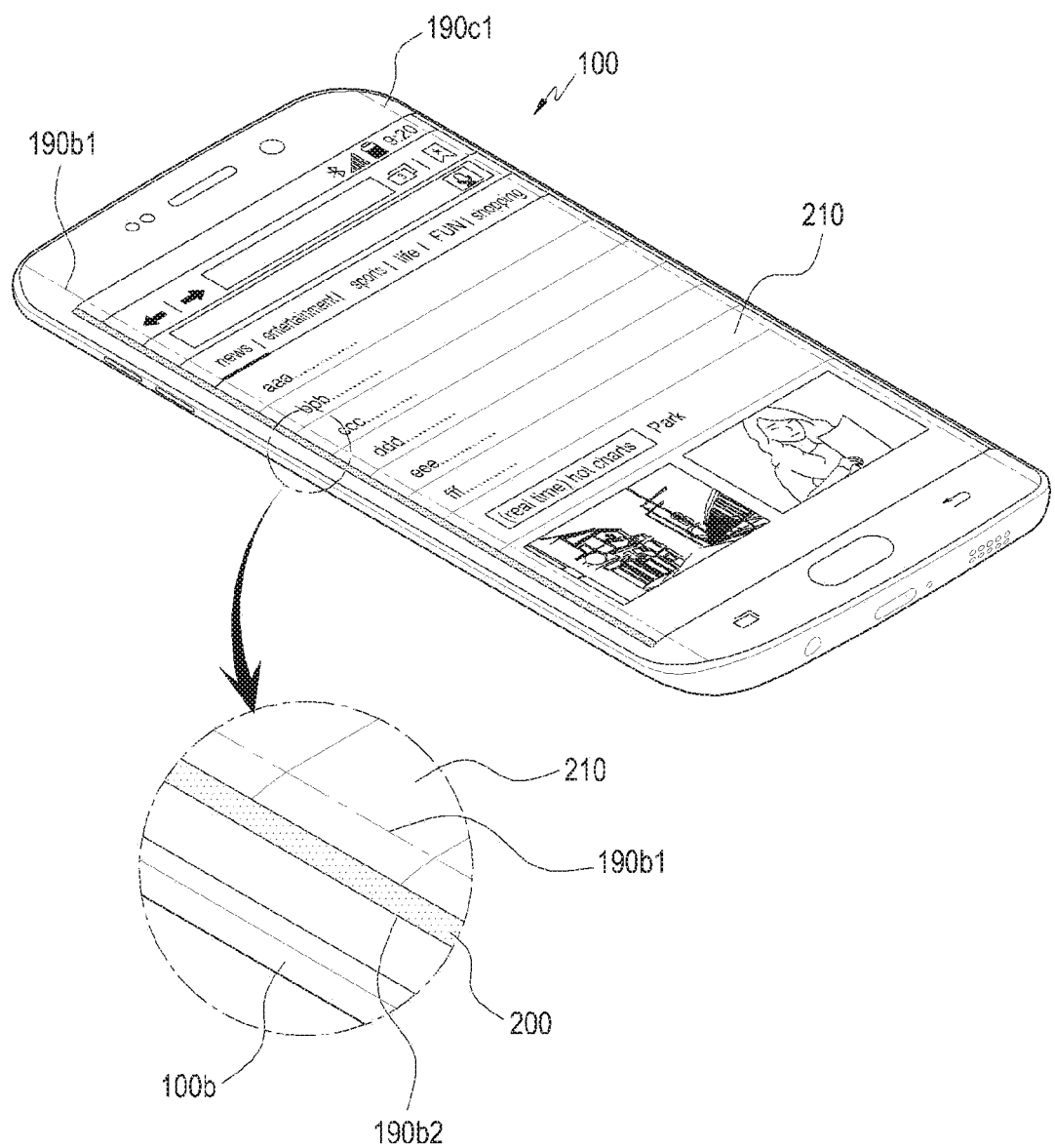
Figure 5C:
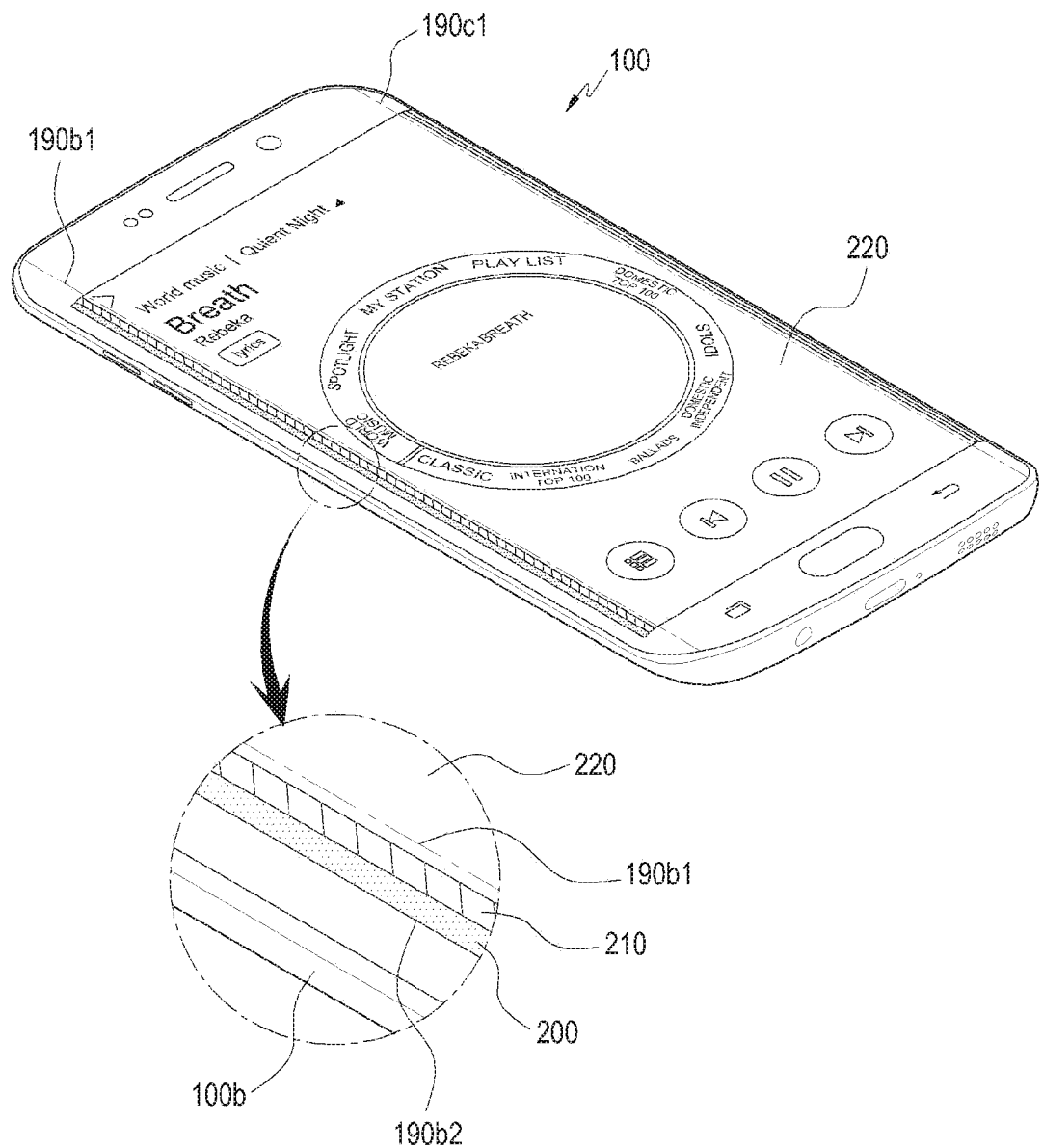
Figure 5D:
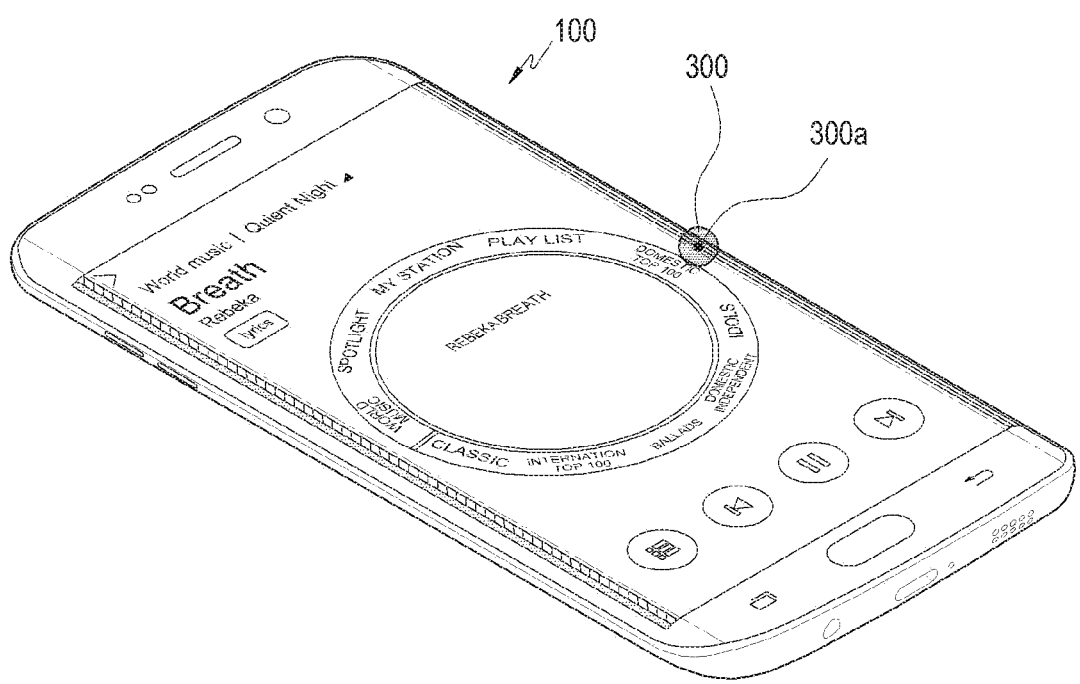
Figure 5E:
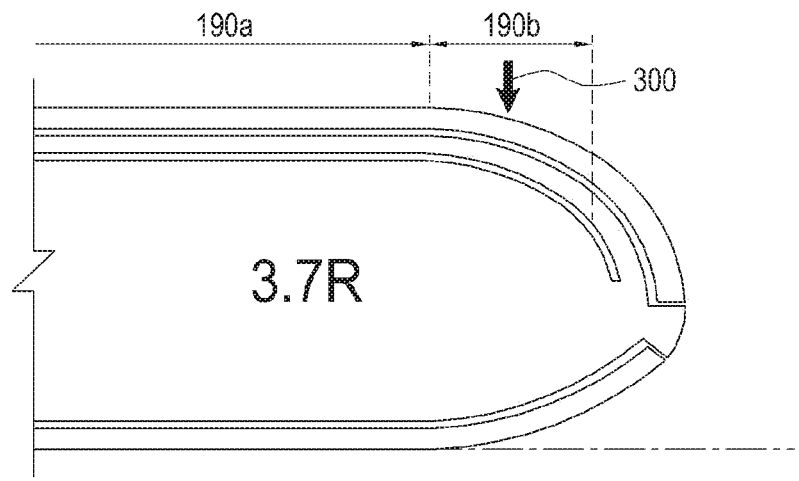
Figure 5E:
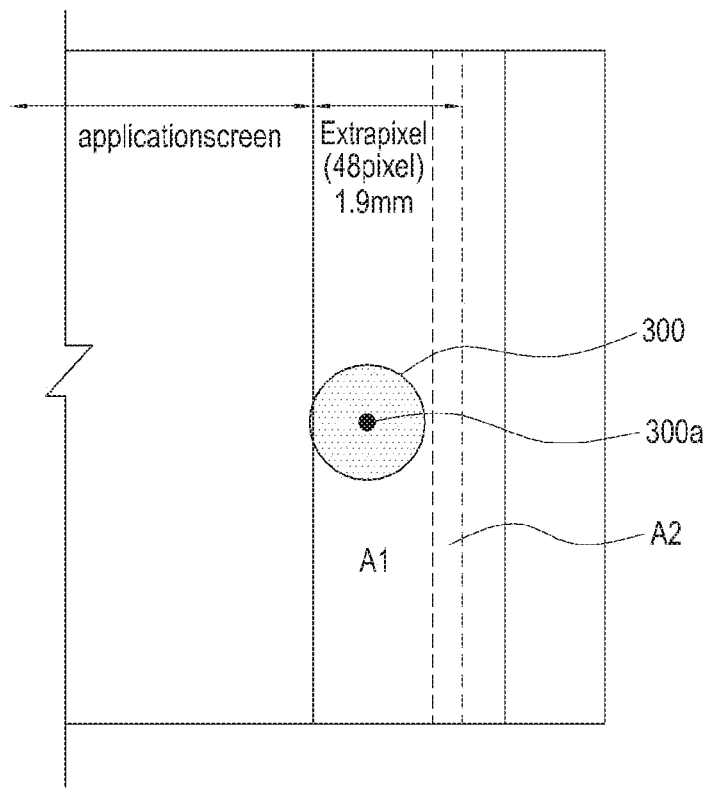
Figure 5F:
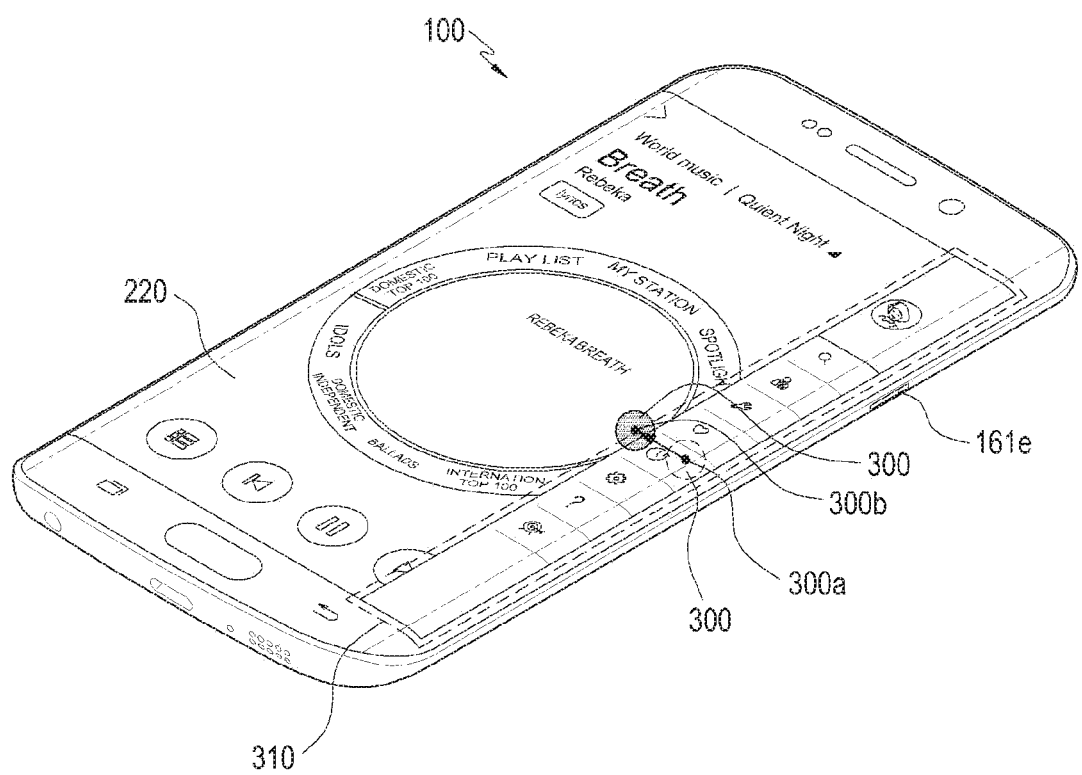

Referring to FIGS. 1, 2, and 5F, the one or more buttons 161 may include the home button 161a, the recently executed app button 161b, and/or the back button 161c located on the lower portion of the front surface 100a of the portable device 100. The one or more buttons 161 may include a power/lock button and one or more volume buttons 161d located on the side surface 100b of the portable device 100. Further, the one or more buttons 161 of the portable device 100 may only include the home button 161a, at least one volume button 161d, and the power/lock button. The one or more buttons 161 may be implemented in touch buttons as well as physical buttons. Further, the one or more buttons 161 of the portable device 100 may be displayed on the touch screen 190 in a text, image, or icon form.

The controller 110 may receive an electrical signal transmitted from the one or more buttons 161 in response to a user input. The controller 110 may detect the user input, using the received signal (for example, pressing the one or more buttons 161 or contacting the one or more buttons 161). The controller 110 may switch an application screen 200, 210, 220 displayed on the edge touch screen 190 in response to a user input.

A form, location, function, and name of the one or more buttons 161 illustrated in FIGS. 1 and 2 are only examples and the present disclosure is not limited thereto.

The one or more microphones 162 receives a voice or a sound and generates an electrical signal under control of the controller 110. An electrical signal generated by the one or more microphones 162 may be converted in an audio CODEC and stored in the storage unit 175 or output through the one or more speakers 163. The one or more microphones 162 may be located on the front surface 100a, the side surface 100b, and/or the rear surface of the portable device 100. Further, the one or more microphones 162 may be located only on the side surface 100b of the portable device 100.

The one or more speakers 163 may output sounds corresponding to various signals (for example, a wireless signal, a broadcasting signal, an audio source, a video file, and taking a picture) decoded by the audio CODEC under control of the controller 110.

The one or more speakers 163 may output a sound (for example, a touch control sound corresponding to a phone number input or a button control sound for taking a picture) corresponding to a function performed by the portable device 100. One or more speakers 163 may be located on the front surface 100a, the side surface 100b, and/or the rear surface of the portable device 100. One or more speakers 163 may be located on the front surface 100a of the portable device 100. Further, one or more speakers 163 may be located on each of the front surface 100a and the rear surface of the portable device 100. One or more speakers 163 may be located on the front surface 100a of the portable device 100 and one or more speakers 163 may be located on the rear surface of the portable device 100.

A plurality of speakers may be located on the side surface 100b of the portable device 100. The portable device 100 may have an additional speaker located on the side surface 100b of the portable device 100, which may provide a user with a sound effect distinguished from another portable device having a speaker located on the front surface 100a and the rear surface of the portable device 100.

According to an embodiment of the present disclosure, the one or more speakers 163 may output audible feedback corresponding to one of display of the application drawer 310 and display of the edge panel 320. For example, the one or more speakers 163 may output audible feedback in response to one of display of the application drawer 310 and display of the edge panel 320 under control of the controller 110.

The one or more vibration motors 164 may convert an electrical signal into a mechanical vibration under control of the controller 110. The one or more vibration motors 164 may include a linear vibration motor, a bar type vibration motor, a coin type vibration motor, or a piezoelectric element vibration motor. For example, when a call request is received from another portable device, the one or more vibration motors 164 may be operated under control of the controller 110.

The one or more vibration motors 164 may be located in the portable device 100. Further, the one or more vibration motors 164 may vibrate the entire portable device 100 or locally vibrate only part of the portable device 100.

According to an embodiment of the present disclosure, the one or more vibration motors 164 may output tactile feedback corresponding to one of display of the application drawer 310 and display of the edge panel 320. For example, the one or more vibration motors 164 may output tactile feedback in response to one of display of the application drawer 310 and display of the edge panel 320 under control of the controller 110. Further, the one or more vibration motors 164 may provide various tactile feedbacks (for example, a vibration strength and a vibration duration time) pre-stored or received from the outside based on a control command of the controller 110.

The connector 165 may be used as an interface for connecting the portable device 100 and an external device, or a power source.

The portable device 100 may transmit data (for example, corresponding to a content) stored in the storage unit 175 externally, or receive data (for example, corresponding to a content) externally through a wired cable connected to the connector 165 under control of the controller 110. The portable device 100 may receive power from a power source through a wired cable connected to the connector 165 or charge a battery under control of the controller 110. Further, the portable device 100 may be connected to an accessary (for example, a speaker and a keyboard dock) through the connector 165.

The keypad 166 may receive a key input from a user in order to control the portable device 100. The keypad 166 may include one of a virtual keypad displayed within the edge touch screen 190 and a physical keypad formed on the front surface 100a of the portable device 100. Further, the keypad 166 may include a separate keypad which may be connected wirelessly (for example, using short range communication) or through a wired cable.

A user may use the input pen 167 to touch (or select) an object (for example, a menu, a text, an image, a video, a figure, an icon, and a shortcut icon) and/or a content (for example, a text file, an image file, an audio file, a video file, or a web page), which are displayed (or included) on the edge touch screen 190 or a screen displayed in a writing/ drawing application (for example, a memo screen, a notepad screen, a calendar screen, etc.), or take a note (for example, by handwriting, drawing, painting, or sketching).

The input pen 167 may use a scheme including a capacitive scheme, a resistive scheme, or an electromagnetic resonance (EMR) scheme.

The input pen 167 may include a stylus pen or a haptic pen having a vibrating device (for example, an actuator or a vibration motor) included therein. The input pen 167 may operate (for example, vibrate) a vibration device in response to not only control information received from the portable device 100 but also sensing information detected in a sensor (for example, an acceleration sensor) included in the input pen 167.

Some functions of the input pen 167 may be performed by a user's finger. When handwriting or drawing is input by a user's finger in an application displayed on the edge touch screen 190 using a capacitive scheme or a resistive scheme, the controller 110 may perform a control such that a touch made by one of fingers including a thumb is detected using the edge touch screen 190 and the edge touch screen controller 195, and a function corresponding to the detected touch is performed.

A shape of an insertion hole and/or a shape (for example, a circular cross section or a polygonal cross section) of the input pen 167 of the portable device 100, or a structure (for example, a battery) of the portable device 100 may vary according to the performance and structure of the portable device 100.

The sensor unit 170 may detect a status of the portable device 100 and/or a condition around the portable device 100. The sensor unit 170 may include one or more sensors. The sensor unit 170 may include a proximity sensor 171 that detects an approach to the portable device 100, an illuminance sensor 172 that detects the amount of light around the portable device 100, and/or a finger print sensor 173 that detects a finger print of a user using the portable device 100.

The finger print sensor 173 may be located on the front surface 100a or the rear surface of the portable device 100.

The sensor unit 170 may include an acceleration sensor for detecting an acceleration in three axes (for example, an x-axis, a y-axis, and a z-axis) applied to the portable device 100, a gravity sensor that detects the direction of gravity, or an altimeter that measures air pressure and detects an altitude. The sensor unit 170 may measure each of a motion acceleration and a gravitational acceleration of the portable device 100. The sensor unit 170 may further include a pulse sensor that detects a user's heartbeat.

At least one sensor included in the sensor unit 170 may detect the status of the portable device 100, generate an electrical signal corresponding to the detection, and transmit the generated signal to the controller 110. A sensor may be added to, changed, or removed from the sensor unit 170 according to the performance of the portable device 100.

The storage unit 175 may store signals or data input/ output in response to the operations of the mobile communication unit 120, the sub communication unit 130, the multimedia unit 140, the camera 150, the GPS 155, the input/output unit 160, the sensor unit 170, and the edge touch screen 190 under control of the controller 110. The storage unit 175 may store a graphical user interface (GUI) associated with a control program for controlling the portable device 100 or the controller 110 and an application provided by a manufacturer or downloaded from the outside, images for providing the GUI, user information, documents, databases, or associated data.

According to an embodiment of the present disclosure, the storage unit 175 may store portable device information including resolution information and size information on the edge touch screen 190, and information on a server capable of connecting to the portable device 100.

The storage unit 175 may store information on a size and a resolution of the edge touch screen 190. Further, the storage unit 175 may store information on a curvature of the edge touch screen 190.

The storage unit 175 may store first user input information corresponding to a first user input, second user input information corresponding to a second user input, and/or third user input information corresponding to a third user input.

The storage unit 175 may store location information of a plurality touches (for example, touches 300a to 300c illustrated in FIGS. 5D, 5F, and 5G described below, etc.) corresponding to successive motions of the first touch 300.

The storage unit 175 may store active area information corresponding to an active area A1 of edge display areas, and/or inactive area information corresponding to an inactive area A2.

The storage unit 175 may store visual feedback (for example, a video source, etc.) that is output on the edge touch screen 190 and which may be recognized by a user, audible feedback (for example, a sound source, etc.) that is output from the one or more speakers 163 and which may be recognized by a user, and tactile feedback (for example, a haptic pattern, etc.) that is output from the vibration motor 164 and which may be recognized by a user, in response to one of a display of an application drawer and a display on an edge panel.

The storage unit 175 may store a time that feedback (for example, 500 ms) is provided to a user.

According to an embodiment of the present disclosure, the term "storage unit" may include the storage unit 175, the ROM 112, and the RAM 113 within the controller 110, or a memory card (for example, a micro secure digital (SD) card and a memory stick) mounted in the portable device 100. The storage unit 175 may include a non-volatile memory, a volatile memory, a hard disk drive (HDD), or a solid state drive (SSD).

The power supply unit 180 may supply power to the elements 110 to 195 located within the portable device 100 under control of the controller 110. The power supply unit 180 may supply power input from an external power source to each of the elements of the portable device 100 through a wired cable connected to the connector 165 under control of the controller 110.

The power supply unit 180 may supply power to one or more batteries and charge the batteries under control of the controller 110. One or more batteries may be located between the edge touch screen 190 located on the front surface 100a and the rear surface.

The power supply unit 180 may wirelessly charge one or more batteries by using a coil under control of the controller 110 (for example, through a magnetic resonance scheme, an electromagnetic wave scheme, or a magnetic induction scheme).

The edge touch screen 190 may provide a GUI corresponding to various services (for example, a voice call, a video call, data transmission, broadcast reception, a taking of a photograph, a view of a video, or an execution of an application) to a user. The edge touch screen 190 includes an edge touch panel for receiving a touch input and an edge display panel for displaying a screen.

The edge touch screen 190 transmits an analog signal corresponding to a single touch or a multi-touch input through a home screen or a GUI to the edge touch screen controller 195. The edge touch screen 190 may receive the single touch or the multi-touch through a user's body (for example, fingers) or the input pen 167.

Figure 3A:
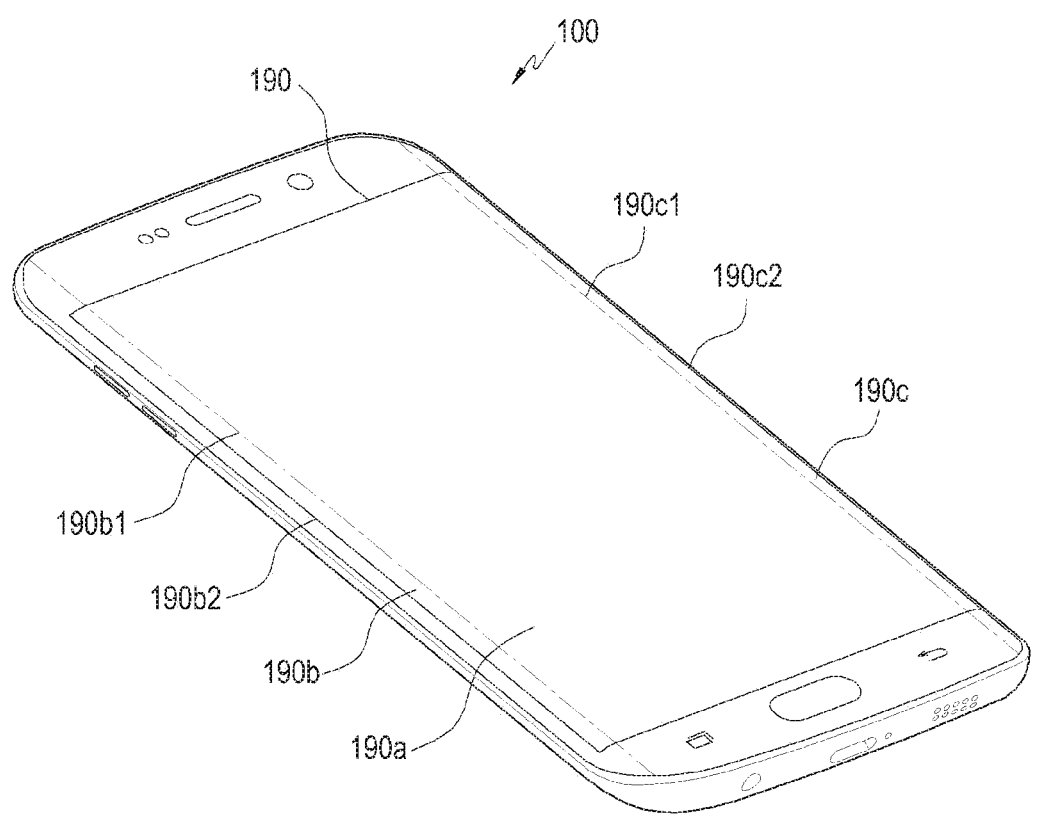
FIG. 3A is a front perspective view of an edge touch screen of a portable device according to an embodiment of the present disclosure.

FIG. 3A is a front perspective view of an edge touch screen 190 of a portable device 100 according to an embodiment of the present disclosure.

Figure 3B:
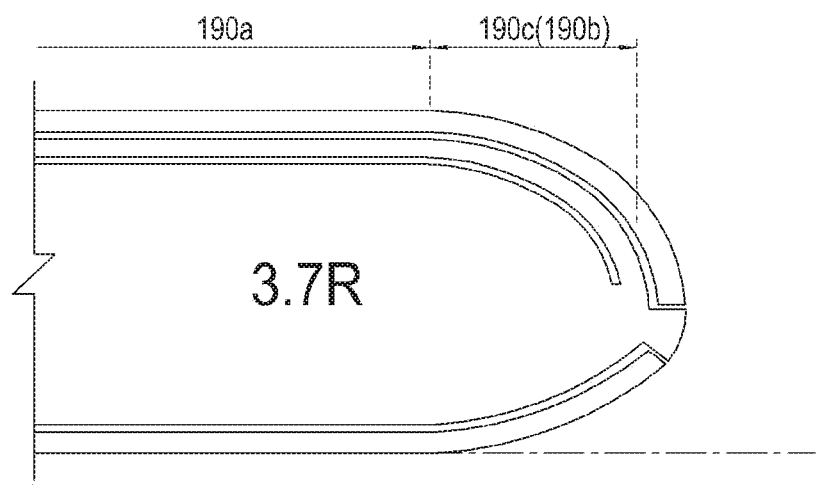
FIGS. 3B to 3D are diagrams of sectional views of an edge touch screen of a portable device according to embodiments of the present disclosure.
Figure 3C:
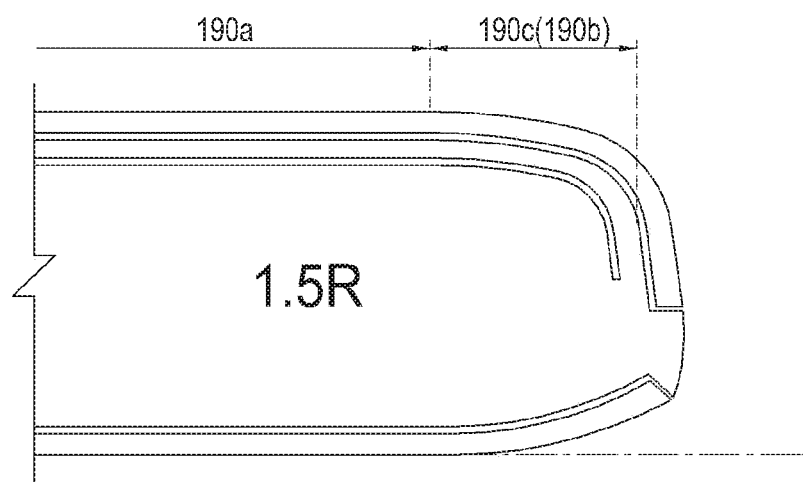
Figure 3D:
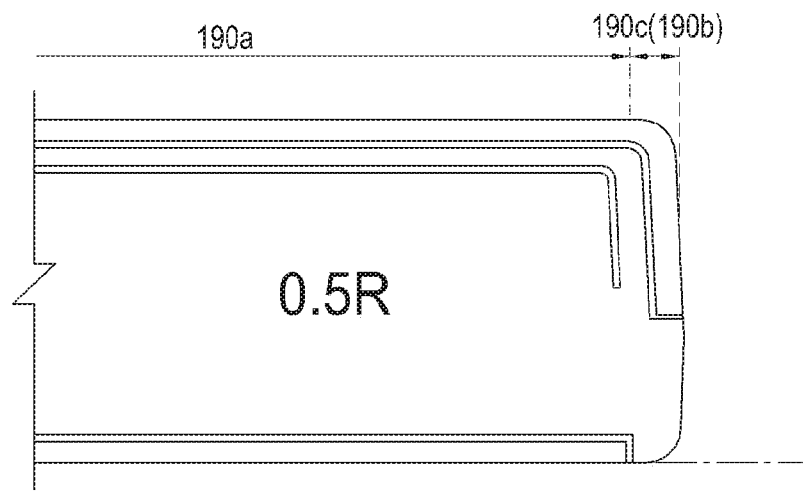

FIGS. 3B to 3D are diagrams of sectional views of an edge touch screen 190 of a portable device 100 according to embodiments of the present disclosure.

Referring to FIG. 3A, the edge touch screen 190 may be an integral touch screen with both sides bent. The edge touch screen 190 may include the main display area 190*a* and edge display areas 190*b*, 190*c*.

For example, the resolution of the edge touch screen 190 may be 2560 pixel×1600 pixel. The resolution of the main display area 190*a* in the edge touch screen 190 may be 2560 pixel×1440 pixel. The resolution of each of the edge display areas 190*b*, 190*c* may be 2560 pixel×1600 pixel.

In the portable device 100, the resolution of the edge touch screen 190 may vary. The resolution of the edge touch screen 190 described above is only an example, and the present disclosure is not limited thereto.

The main display area 190*a* may be flat or may have a curvature (for example, approximate to a flat surface) less than curvatures of the edge display areas 190*b*, 190*c*.

According to an embodiment of the present disclosure, the main touch screen area 190*a* may include a touch screen area corresponding to the main display area 190*a*. Further, the first and second edge touch screens 190*b* and 190*c* may include the touch screen area corresponding to each of the edge display areas 190*b*, 190*c*.

The first edge touch screen 190*b* may refer to a touch screen corresponding to one edge display area between the edge display areas 190*b*, 190*c*. The second edge touch screen 190*c* may refer to a touch screen corresponding to the other edge display area, which is not the first edge touch screen area, between the edge display areas 190*b*, 190*c*.

When the first edge touch screen 190*b* is the touch screen corresponding to the edge display area 190*b*, the second edge touch screen 190*c* may be the touch screen corresponding to the edge display area 190*c*. In contrast, when the first edge touch screen 190*b* is the touch screen corresponding to the edge display area 190*c*, the second edge touch screen 190*c* may be the touch screen corresponding to the edge display area 190*b*.

The main display area 190*a* may be separated from the edge display areas 190*b*, 190*c* by virtual lines 190*b*1 and 190*c*1. The main display area 190*a* may refer to a display area between the virtual lines 190*b*1, 190*c*1.

The virtual lines 190*b*1 and 190*c*1 may refer to lines from which the curvature of the main display area 190*a* starts being changed. The virtual lines 190*b*1 and 190*c*1 may also refer to lines at which the curvature of the main display area 190*a* is changed to the curvature of the edge display areas 190*b*, 190*c*. The virtual lines 190*b*1, 190*c*1 may correspond to lines at which the curvature of the main display area 190*a* is changed to one of first curvatures of the single curvature and the multi-curvature of the edge display areas 190*b*, 190*c*.

The edge display areas 190*b*, 190*c* may refer to an area between the virtual lines 190*b*1, 190*c*1 and edges (including 190*b*2 and 190*c*2).

FIG. 3B is an illustration of the edge display areas 190*b*, 190*c* having a curvature of 3.7R, FIG. 3C is an illustration of the edge display areas 190*b*, 190*c* having a curvature of 1.5R, and FIG. 3D is an illustration of the edge display areas 190*b*, 190*c* having a curvature of 0.5R.

The curvature of the edge display areas 190*b*, 190*c* may include one of the single curvature and the multi-curvature. In the edge display areas 190*b*, 190*c*, the single curvature may refer to the edge display areas 190*b*, 190*c* having one curvature. For example, the single curvature may be less than or equal to 13R, and be greater than or equal to 0.5R. Cross sections of both sides of the portable device 100 including the edge display areas 190*b*, 190*c* having the single curvature may include a semicircle or an oval.

In the edge display areas 190*b*, 190*c*, the multi-curvature may refer to the edge display areas 190*b*, 190*c* having a first curvature corresponding to areas including the virtual lines (including 190*b*1 and 190*c*1), which are extended and bent from the main display area 190*a*, and a second curvature corresponding to areas (for example, including edge areas 190*b*2 and 190*c*2 of the edge display areas 190*b*, 190*c*) contacted with a bezel of the front surface, the second curvature being different from the first curvature.

For example, in the multi-curvature, the first curvature may be less than or equal to 12R. The first curvature may be less than or equal to 13R, and greater than or equal to 0.5R. Further, the second curvature, that is the remaining curvature in the multi-curvature, may be less than or equal to 7R. The second curvature may be less than or equal to 8R, and greater than or equal to 0.5R. A cross section of one of a side surface or both side surfaces of the portable device 100 including an edge touch screen 190*b*, 190*c* having the multi-curvature may include a semicircle or an oval.

The curvature of a left edge display area 190*b* and the curvature of a right edge display area 190*c* may be different. When the edge display areas 190*b*, 190*c* correspond to the single curvature, the curvature of the left edge display area 190*b* may be, for example, 6.5R. Further, the curvature of the right edge display area 190*c* may be 3.75R.

One of the edge display areas 190*b*, 190*c* may have the single curvature, and the other edge display area may have the multi-curvature. For example, the left edge display area 190*b* may be the single curvature, and the right edge display area 190*c* may be the multi-curvature. The single curvature of the left edge display area 190*b* may be 13R, and the first curvature of the right edge display area 190*c* may be 12R and the second curvature of the right edge display area 190*c* may be 6.5R.

In an embodiment of the present disclosure, the single curvature value and/or the multi-curvature value are only examples and the present disclosure is not limited thereto. The single curvature value and/or the multi-curvature value may vary.

The edge display panel includes a plurality of pixels and displays an image through the pixels. For example, the edge display panel may include a liquid crystal display (LCD) or OLEDs.

According to an embodiment of the present disclosure, a touch is not limited to a contact between the edge touch screen 190 and a user's body or the input pen 167, but includes a non-contact input. For example, the non-contact input may include hovering in which an interval between the edge touch screen 190 and a user's body or the input pen 167 is less than or equal to 50 mm. A non-contact interval, which may be detected by the edge touch screen 190, may be changed according to the performance or the structure of the portable device 100.

The edge touch screen 190 may be, for example, implemented by a resistive scheme or a capacitive scheme.

The edge touch screen 190 may include an EMR type. The edge touch screen of the EMR type may further include a separate edge touch panel of the EMR type for receiving an input of an input pen 167 having a resonant circuit that resonates in a loop coil of the EMR type.

The edge touch screen 190 according to an embodiment of the present disclosure may output visual feedback corresponding to switching to another screen in response to a touch gesture input into the edge touch screen 190. The edge touch screen 190 may display visual feedback corresponding to a content that varies in response to switching to another screen according to a touch gesture input to the edge touch screen 190 under control of the controller 110.

According to an embodiment of the present disclosure, a display unit may include the edge touch screen 190.

The edge touch screen controller 195 converts an analog signal corresponding to a single touch or a multi-touch received from the edge touch screen 190 into a digital signal and transmits the converted digital signal to the controller 110. The controller 110 may calculate an X coordinate and a Y coordinate corresponding to a touch location of a touch input to the edge touch screen 190 using the digital signal received from the edge touch screen controller 195.

The controller 110 may control the edge touch screen 190 by using the digital signal received from the edge touch screen controller 195. For example, the controller 110 may display a shortcut icon displayed on the edge touch screen 190 to be distinguished from another shortcut icon in response to an input touch, or execute an application (for example, a phone application) corresponding to a selected shortcut icon to display an application screen on the edge touch screen 190.

The edge touch screen controller 195 may be implemented by one edge touch screen controller or a plurality of edge touch screen controllers. The edge touch screen controller 195 may be included in the controller 110 according to the performance or structure of the portable device 100.

Separately from the analog signal corresponding to the single touch or the multi-touch received from the edge touch screen 190, the edge touch screen controller 195 may convert an analog signal corresponding to a touch received from the edge touch screen 190 of the electromagnetic resonance type into a digital signal and transmit the converted digital signal to the controller 110. The controller 110 may calculate an X coordinate and a Y coordinate corresponding to a touch location on the edge touch screen 190 of the electromagnetic resonance type based on the digital signal received from the edge touch screen controller 195. Further, the edge touch screen 190 of the electromagnetic resonance type may use an edge touch screen controller of the electromagnetic resonance type.

The portable device 100 illustrated in FIGS. 1 and 2 is associated with only the edge touch screen 190, but may have a plurality of edge touch screens. Each edge touch screen may be located in each housing and each housing may be connected to each other by one or a plurality of hinges.

A plurality of edge touch screens disposed on the top/bottom or the left/right may be located on the front surface of one housing. The plurality of edge touch screens may be implemented by a display panel and a plurality of touch panels. The plurality of edge touch screens may be implemented by touch panels corresponding to a plurality of display panels. Further, the plurality of edge touch screens may be implemented by a plurality of touch panels corresponding to a plurality of display panels.

At least one element may be added, deleted, or modified from the elements of the portable device 100 illustrated in FIGS. 1 and 2 according to the performance of the portable device 100.

Figure 4:
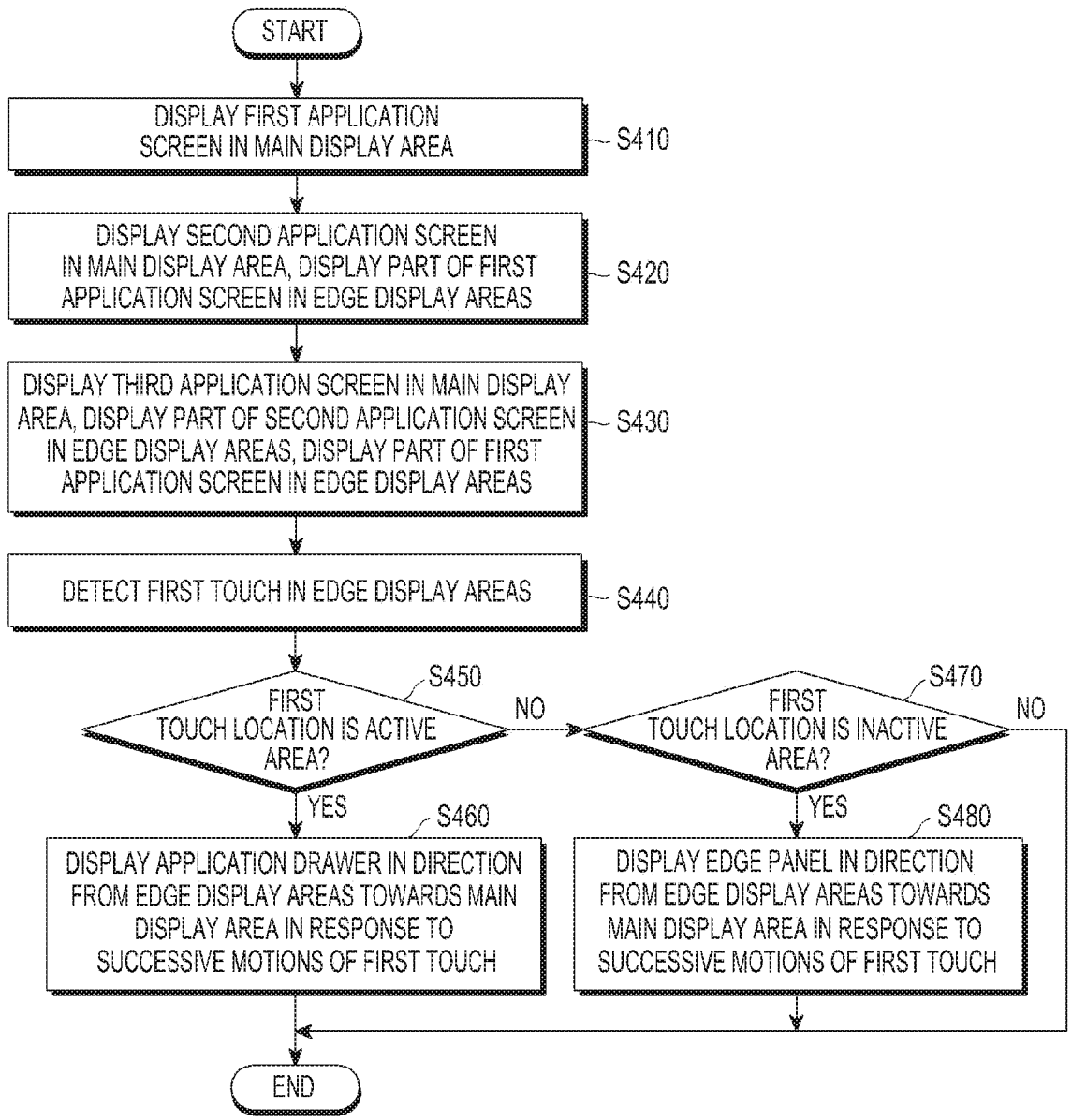
FIG. 4 is a flowchart of a screen display method of a portable device according to an embodiment of the present disclosure.

FIG. 4 is a flowchart of a screen display method of a portable device 100 according to an embodiment of the present disclosure.

FIGS. 5A to 5J are diagrams of a screen of an electronic device according to an embodiment of the present disclosure.

Referring to FIG. 4, in step S410, the first application screen is displayed in the main display area.

Referring to FIG. 5A, a first application (for example, a video sharing application) screen 200 is displayed on the edge touch screen 190 in response to a first input of a user. The first application screen may include not only a video sharing application screen 200 but also a web browser, a mobile payment application, a photo album application, a word processor, a spread sheet, a contact application, a calendar application, a memo application, an alarm application, an SNS application, a game store, a chat application, a map application, a music player, or a video player screen.

A user may select (for example, by the first user input) a shortcut icon (for example, a shortcut icon corresponding to the first application) among one or more shortcut icons displayed on a home screen. According to an embodiment of the present disclosure, a user input includes an input (for example, a touch, a pressure, a voice, a motion, or the like) to display an application screen on the edge touch screen 190.

The controller 110 may detect the first input using the edge touch screen 190 and the edge touch screen controller 195. The controller 110 may calculate a location of the first user input (for example, X coordinate X1 and Y coordinate Y1) corresponding to the first user input using an electrical signal received from the edge touch screen controller 195.

The controller 110 may execute the first application (for example, a video sharing application) corresponding to the first user input. The first application screen 200 may be displayed on the edge touch screen 190 under control of the controller 110.

The first application screen may be displayed on the edge touch screen 190 (e.g. a 2560 pixel×1600 pixel area). The first application screen 200 may be displayed in the main touch screen area 190a (for example, a 2560 pixel×14440 pixel area between the virtual lines 190b1 and 190c1) and each of the edge touch screen areas (190b, 190c, for example, a 2560 pixel×80 pixel area). Further, the first application screen 200 may be displayed only in the main touch screen area 190a (for example, a 2560 pixel×1440 pixel area).

The first application screen may include not only the screen described above but also various application screens which may be displayed on the edge touch screen 190. Further, other applications may be executed.

In step S420 if FIG. 4, the second application screen is displayed on the main display area 190a, and the first application screen is displayed in the edge display areas 190b, 190c.

Referring to FIG. 5B, the second application (for example, a web browser) screen 210 is displayed in response to a second user input on the edge touch screen 190. The second application screen may include not only the first application individually executed by multitasking but also a mobile payment application, a photo album application, a word processor, a spread sheet, a contact application, a calendar application, a memo application, an alarm application, an SNS application, a game store, a chat application, a map application, a music player, or a video player screen.

A user may select (for example, by the second user input) a shortcut icon (for example, a short cut icon corresponding to the second application) among one or more shortcut icons displayed on a home screen.

The controller 110 may detect the second user input using the edge touch screen 190 and the edge touch screen controller 195. The controller 110 may calculate a location of the second user input (for example, an X coordinate X2 and a Y coordinate Y2) corresponding to the second user input, using an electrical signal received from the edge touch screen controller 195.

The controller 110 may execute the second application (for example, a web browser) corresponding to the second user input. The second application screen 210 may be displayed on the edge touch screen 190 under control of the controller 110.

The second application screen 210 may be displayed on the main touch screen area 190a (e.g., a 2560 pixel×1440 pixel area between 190b1 and 190c1). Further, the second application screen 210 may be displayed in the main touch screen area 190a and the edge touch screen areas 190b, 190c, at the same time.

The first application screen 200 having been previously displayed may be displayed in the edge touch screen area 190b, 190c (e.g. each a 2560 pixel×80 pixel area). The first application screen 200 having been previously displayed and the second application screen 210 may be displayed as overlapping. The first application screen 200 having been previously displayed may be displayed to be distinguished by a layer from the second application screen 210. The first application screen 200 having been previously displayed may be displayed under the second application screen 210 to be distinguished therefrom. Further, the first application screen 200 having been previously displayed may be only partially displayed (for example, not being covered by the second application screen 210, or the edge area of the first application screen being displayed) under the second application screen 210.

The area of the first application screen 200 being displayed may be greater than the area of the second application screen 210. For example, the area of the first application screen 200 may be greater than the area of the second application screen 210, in consideration of the area of the second application screen 210 displayed on the main display area 190a and the area of the first application screen 200 covered by the second application screen 210. In this case, a part of the first application screen 200 may be displayed in at least one of the edge touch screen areas 190b, 190c.

If the area of the first application screen 200 being displayed is equal to the area of the second application screen 210, the second application screen 210 may cover the first application screen 200 so that the first application screen 200 is not shown.

Further, the area of the first application screen 200 may be less than or equal to the area of the second application screen 210. In this case, a part of the first application screen 200 may be displayed in one (for example, edge touch screen area 190b) of the edge touch screen areas 190b, 190c, by positioning the first application screen 200 to be exposed in the lower left portion of the second application screen 210.

The second application screen 210 may include not only the screen described above but also various application screens which may be displayed on the edge touch screen 190. Further, other applications may be executed.

In step S430 of FIG. 4, the third application screen is displayed in the main display area 190a, a part of the second application screen is displayed in the edge display areas, and a part of the first application screen is displayed in the edge display areas.

Referring to FIG. 5C, the third application (for example, a music player) screen 220 is displayed in response to a third user input on the edge touch screen 190. The third application screen may include not only the second application or the first application individually executed by multitasking but also a web browser, a mobile payment application, a photo album application, a word processor, a spread sheet, a contact application, a calendar application, a memo application, an alarm application, an SNS application, a game store, a chat application, a map application, or a video player screen.

A user may select (for example, by the third user input) a shortcut icon (for example, a shortcut icon corresponding to the third application) among one or more shortcut icons displayed on a home screen.

The controller 110 may detect the third user input using the edge touch screen 190 and the edge touch screen controller 195. The controller 110 may calculate a location of the third user input (for example, an X coordinate X3 and a Y coordinate Y3) corresponding to the third user input, using an electrical signal received from the edge touch screen controller 195.

The controller 110 may execute the third application (for example, a music player) corresponding to the third user input. The third application screen 220 may be displayed on the edge touch screen 190 under a control of the controller 110.

The third application screen 220 may be displayed on the main touch screen area 190a (e.g. a 2560 pixel×1440 pixel area between 190b1 and 190c1). Further, the third application screen 220 may be displayed in the main touch screen area 190a and the edge touch screen areas 190b, 190c, at the same time.

The second application screen 210 having been previously displayed may be displayed in the edge touch screen area 190b, 190c (e.g. each a 2560 pixel×80 pixel area). The second application screen 210 and the first application screen 200 which have been previously displayed may be displayed as overlapping with the third application screen 220. The second application screen 210 and the first application screen 200 which have been previously displayed may be displayed to be distinguished by layers from the third application screen 220. The second application screen 210 and the first application screen 200 which have been previously displayed may be displayed under the third application screen 220 to be distinguished therefrom. The second application screen 210 may be located on the first application screen 200.

Only a part (for example, a part of the second application screen 210 and a part of the first application screen 200 may be covered by the third application screen 220) of the second application screen 210 and first application screen 200 which have been previously displayed may be displayed under the third application screen 220. Further, the first application screen 200 having been previously displayed may be only partially displayed (for example, covered by at least one of the third application screen 220 and the second application screen 210) under the third application screen 220 and the second application screen 210.

Referring to FIG. 5C, the number of application screens which may be displayed in each of the edge touch screen areas 190b, 190c (e.g. each 2560 pixel×80 pixel area) is two.

Two application screens may be equally displayed in units of 40 pixels. Further, two application screens may be displayed unequally. For example, one application screen (for example, the second application screen) may be displayed in two thirds of the area of 80 pixels, and another application screen (for example, the first application screen) may be displayed in one third of the area of 80 pixels.

The number of application screens which may be displayed in each of the edge touch screen areas 190b, 190c (e.g. each 2560 pixel×80 pixel area) may vary according to the size (or resolution) of the edge touch screen area 190b, 190c (for example, one, three, four, five, or more).

The number (for example, two) of application screens described above which may be displayed is an example, but the present disclosure is not limited thereto.

The area of the first application screen 200 being displayed may be greater than the area of the first application screen 220. The area of the first application screen 200 being displayed may be greater than the area of the second application screen 210. For example, the first application screen 200 may be greater than the area of the third application screen 220 and the first application screen 200 may be greater than the area of the second application screen 210, in consideration of the area of the third application screen 220 being displayed in the main display area 190a and the area of the first application screen 200 covered by the third application screen 220. Further, the area of the second application screen 210 may be greater than the area of the third application screen 220, in consideration of the area of third application screen 220 being displayed in the main display area 190a and the area of the second application screen 210 covered by the third application screen 220. Accordingly, a part of the first application screen 200 or a part of the second application screen 210 may be displayed in at least one of the edge touch screen area 190b, 190c.

If the area of the first application screen 200 is equal to the area of the third application screen 220, the third application screen 220 may cover the first application screen 200 so that the first application screen 200 is not shown. Further, when the area of the first application screen 200 is equal to the area of the second application screen 210, the second application screen 210 may cover the first application screen 200 so that the first application screen 200 is not shown.

The areas of the first application screen 200 and second application screen 210 being displayed may be less than or equal to the area of the third application screen 220. In this case, parts of the first application screen 200 and the second application screen 210 may be displayed in one (for example, edge touch screen area 190b) of the edge touch screen areas 190b, 190c, by positioning the first application screen 200 and the second application screen 210 to be exposed in the lower left portion of the third application screen 220.

The third application screen 220 may include not only the screen described above but also various application screens which may be displayed on the edge touch screen 190. Further, other applications may be executed.

In step S440 of FIG. 4, a first touch is detected in the edge display areas 190b, 190c.

Referring to FIGS. 5D and 5E, a user may perform the first touch 300 in the edge display areas 190b or 190c. Further, the user may perform the first touch 300 in one of the first edge display area 190b and the second edge display area 190c.

The controller 110 may detect the first touch 300 by using the edge touch screen 190 and the edge touch screen controller 195.

The first touch 300 detected in the edge display areas 190b or 190c, for example, may be generated by a touch (for example, a contact or a hovering) by one of a user's fingers or the input pen 167 which may be used for touching. Further, the first touch 300 may be generated by either the left hand and the right hand.

According to an embodiment of the present disclosure, the number of touches detected in the edge display areas 190b or 190c is not limited to one, and a plurality of touches may be detected. When a plurality of touches are detected in the edge display areas 190b or 190c, the controller 110 may store a plurality of touch locations corresponding to the plurality of touches and information on the plurality of touch locations in the storage unit 175.

In step S450 of FIG. 4, it is determined whether or not the first touch location is in the active area.

Referring to FIGS. 5EA and 5EB, the controller 110 may select one of the main display area 190a and the edge display areas 190b or 190c, using the calculated first touch location.

The active area A1 in the edge display areas 190b, 190c may refer to an area in which touch reception and touch location (for example, touch coordinates) calculation are possible. Further, the inactive area A2 in the edge display areas 190b, 190c may be an area in which touch reception is possible but touch location calculation is not possible. The controller 110 may not calculate a touch location corresponding to a touch received from the inactive area A2. When a touch is received from the inactive area A2, the controller 110 may prevent (for example, restricting touch location calculation) a touch malfunction caused by a defect of the portable device 100.

The controller 110 may calculate the first touch location 300a (for example, X coordinate X11 and Y coordinate Y11) corresponding to the first touch 300 by using an electrical signal received from the edge touch screen controller 195.

The controller 110 may store first touch location information corresponding to the first touch location 300a in the storage unit 175. The stored first touch location information may include a touch identifier (ID), a touch location, a touch detection time, or touch information (for example, a touch pressure, a touch direction, and a touch duration time) for history management. The controller 110 may determine that the first touch is located in the active area A1 of the edge display areas 190b, 190c, using the calculated first touch location.

In step S450 of FIG. 4, if the touch location is within the active area A1, the method of FIG. 4 proceeds to step S460. Further, if the first touch location is not within the active area A1, the method of FIG. 4 proceeds to step S470.

In step S460 of FIG. 4, the application drawer 310 illustrated in FIG. 5F is displayed in a direction from the edge display areas towards the main display area 190a, in response to successive motions of the first touch. The application drawer 310 may be displayed on a screen (for example, being exposed in one of upper, lower, left, and right sides of the application screen) separated from the application screen, and may execute an additional function of the application (for example, a search, a favorite function, a setting, help, or the like, which varies according to an application type).

Figure 5G:
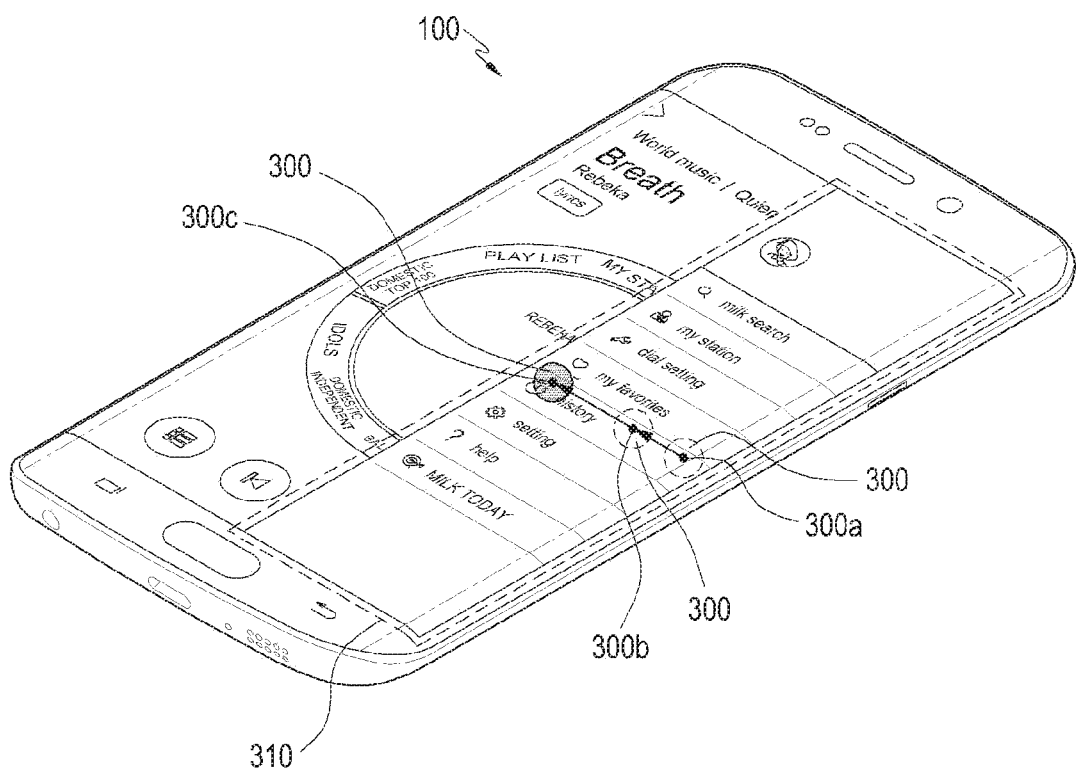

Referring to FIGS. 5F and 5G; the controller 110 may detect (or calculate) successive motions of the first touch 300 (for example, a plurality of X and Y coordinates corresponding to successive motions of the first touch 300) initiated from the active area A1, using the edge touch screen 190 and the edge touch screen controller 195. Successive motions of the first touch 300 may be stored in the storage unit 175 under control of the controller 110. The touch on the edge display areas 190*b* or 190*c* may be a single touch or a plurality of touches.

Successive motions of the first touch 300 (for example, moving from an initial location 300*a* to a last location 300*c*) may refer to a first touch gesture detected from the edge display areas 190*b* or 190*c* to the main display area 190*a*.

Successive motions of the first touch 300 (for example, moving from an initial location 300*a* to a last location 300*c*) may indicate that the contact of the first touch 300 is continuously maintained from the edge display areas 190*b* or 190*c* to the main display area 190*a*. Further, in successive motions of the first touch 300, the contact on the main touch screen 190*a* may be touch-released at the last location 300*c*.

Successive motions of the first touch 300 from the edge display areas 190*b* or 190*c* to the main display area 190*a* may include a drag, a drag and drop, a flick, or a swipe.

According to an embodiment of the present disclosure, "successive motions of a touch" includes a plurality of touches, and the description above of three touch locations 300*a* to 300*c* is one embodiment of the present disclosure, but the present disclosure is not limited thereto. The number of touches included in successive motions of a touch may vary.

When successive motions of the first touch 300 initiated from the active area A1 are detected, the controller 110 may enable the application drawer 310 to be exposed from edges 190*b*2 or 190*c*2 of the edge display areas 190*b* or 190*c*.

When successive motions of the first touch 300 initiated from the active area A1 are detected, the controller 110 may enable the third application screen 220 and the application drawer 310 to be displayed as overlapping. For example, the exposed application drawer 310 may cover the third application screen 220 displayed in the main display area 190*a*.

When successive motions of the first touch 300 initiated from the active area A1 are detected, the controller 110 may move the third application screen 220 to correspond to the moving direction of the first touch 300. The controller 110 may display the application drawer 310 in a space generated by the movement of the third application screen 220.

The controller 110 may enable the application drawer 310 to be exposed in accordance with the moving distance of successive motions of the first touch. For example, the controller 110 may enable the exposed area of the application drawer 310 to increase (for example, there is a difference in the exposed area of the application drawer in FIG. 5F and FIG. 5G) as the moving distance of successive motions of the first touch is greater.

When the first touch 300 is detected in the main display area 190*a* and moves to the center area of the main display area 190*a*, the controller 110 may not display the application drawer 310.

The controller 110 may provide feedback corresponding to the display of the application drawer 310 to a user.

The feedback may be provided as one of visual feedback, audible feedback, or tactile feedback. Further, the controller 110 may provide a combination of visual feedback, audible feedback, and tactile feedback to a user.

The visual feedback may include a visual effect (for example, an individual image or an animation effect such as a fade that is applied to the individual image) corresponding to the display of the application drawer 310.

The controller 110 may display the visual feedback on the edge touch screen 190. The controller 110 may display the visual feedback in one of the main display area 190*a* and the edge display areas 190*b* or 190*c*. Further, the controller 110 may display the visual feedback in a combination of the main display area 190*a* and the edge display areas 190*b* or 190*c*.

The audible feedback may include a sound corresponding to the display of the application drawer 310. The controller 110 may output the audible feedback through the one or more speakers 163. The controller 110 may output the audible feedback through one of the first speaker 163*a* or the second speaker 163*b*. Further, the controller 110 may output the audible feedback through a combination of the first speaker 163*a* and the second speaker 163*b*.

The tactile feedback may include a vibration corresponding to the display of the application drawer 310. The controller 110 may output the tactile feedback through the one or more vibration motors 164. When the number of the one or more vibration motors 164 is greater than one, the controller may selectively output the tactile feedback through one of the one or more vibration motors 164.

A time for providing feedback (for example, 500 ms) to the user may be changed through an environment setting. Further, at least one of a plurality of feedback types (for example, a visual feedback, an audible feedback, and a tactile feedback) provided in response to the display of the application drawer 310 may be selected.

In step S460 of FIG. 4, when the controller 110 displays the application drawer 310, a screen display method of a portable device is terminated.

Returning to step S450 of FIG. 4, when the first touch location is not the active area A1, the method of FIG. 4 proceeds to step S470.

In step S470 of FIG. 4, it is determined whether or not the first touch location is in an inactive area.

Figure 5H:
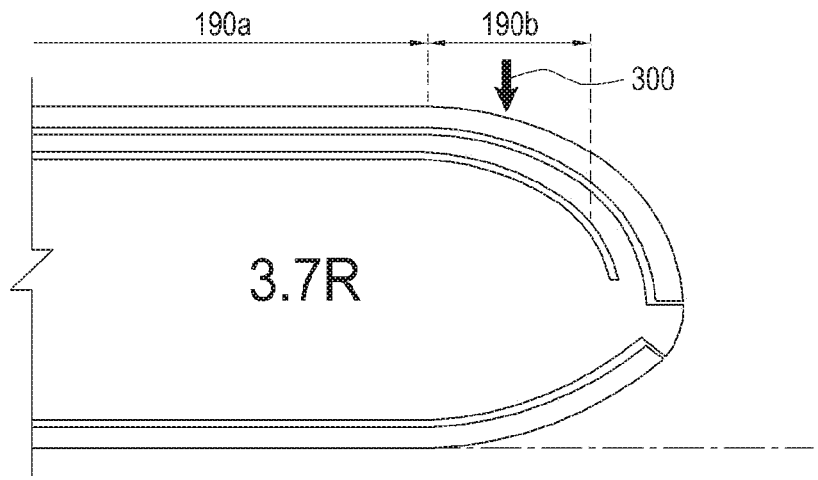
Figure 5H:
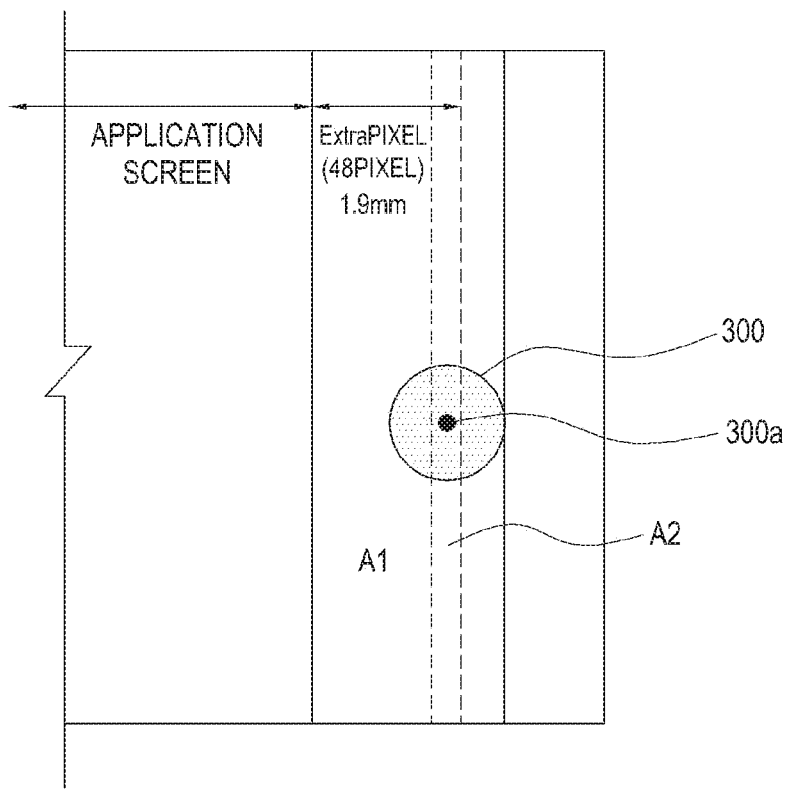

Referring to FIGS. 5HA and 5HB, when the first touch location corresponding to the first touch 300 is not calculated, the controller 110 may determine that the first touch location is within an inactive area A2 in the edge display areas 190*b* or 190*c*.

The controller 110 may store, in the storage unit 175, inactive area touch detection information corresponding to a first touch detection in the inactive area A2. The inactive area touch detection information stored in the storage unit 175 may include a touch ID, a touch detection time, or touch information (for example, a touch pressure, a touch direction, and a touch duration time) for history management.

When the first touch location is in the inactive area A2 in step S470 of FIG. 4, the method of FIG. 4 proceeds to step S480. Further, if the first touch location is not in the inactive area A2, the screen display method of the portable device 100 is terminated.

In step S480 of FIG. 4, the edge panel is displayed in a direction from the edge display areas 190*b*, 190*c* towards the main display area 190*a*, in response to successive motions of the first touch. The edge panel 320 in FIG. 5J may be a panel (e.g. a control panel) displayed in the edge display areas 190*b* or 190*c*, in which a shortcut icon corresponding to a frequently used application (for example, a call application, a contact list application, a web browser application, a text message application, a widget application, or the like) is registered, or a phone number of an incoming call, the content of a received text message, news, stock information or the like are displayed. Further, a displayed shortcut icon may be executed according to a user input and displayed in the main display area 190*a*.

Figure 5I:
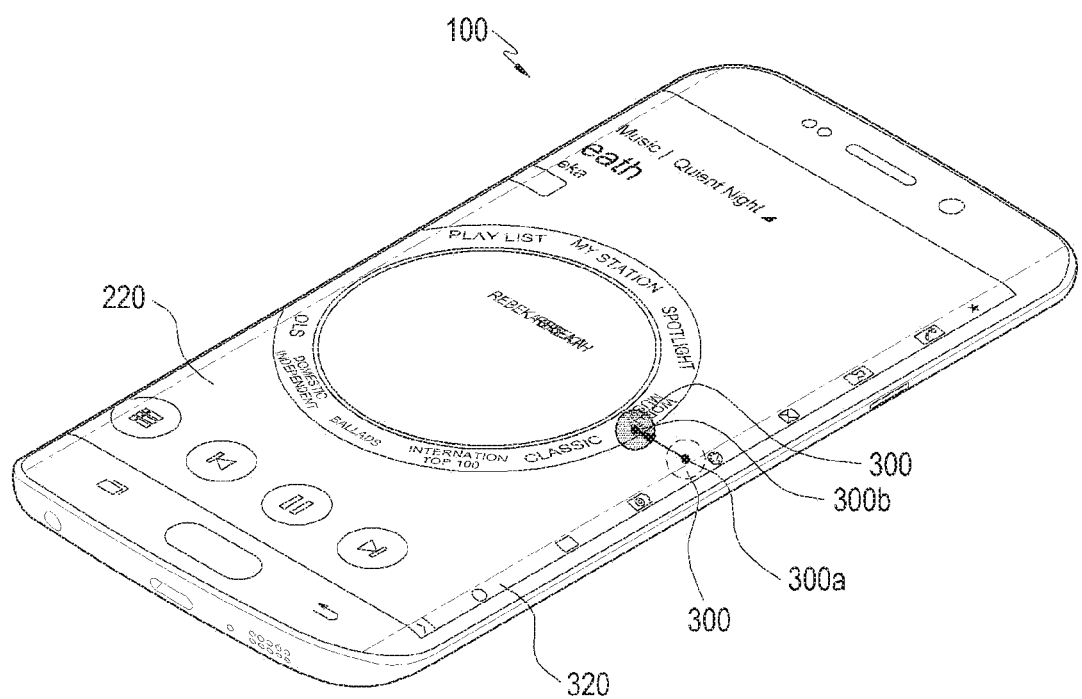
Figure 5J:
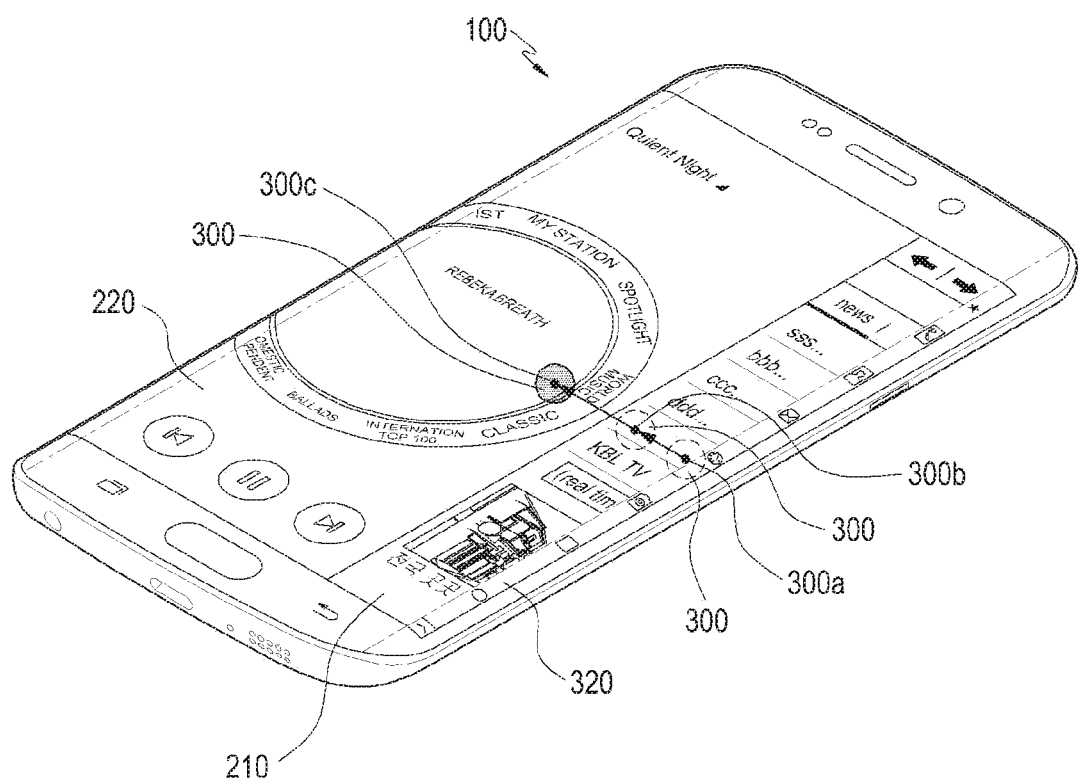

Referring to FIGS. 5I and 5J, the controller 110 may detect (or calculate) successive motions (for example, a plurality of X and Y coordinates corresponding to successive motions) of the first touch 300 initiated from the inactive area A2, using the edge touch screen 190 and the edge touch screen controller 195. Successive motions of the first touch 300 may be stored in the storage unit 175 under control of the controller 110. A touch on the edge display areas 190b or 190c may be a single touch or a plurality of touches.

Successive motions of the first touch 300 initiated from the inactive area A2 (for example, moving from an initial location 300a to a last location 300c) may refer to a first touch gesture detected from the edge display areas 190b or 190c to the main display area 190a.

Successive motions of the first touch 300 initiated from the inactive area A2 (for example, moving from an initial location 300a to a last location 300c) may indicate that the contact of the first touch 300 is continuously maintained from the edge display areas 190b or 190c to the main display area 190a. Further, in successive motions of the first touch 300, the contact on the main touch screen 190a may be touch-released at the last location 300c.

Successive motions of the first touch 300 from the inactive area A2 of the edge display areas 190b or 190c to the main display area 190a may include a drag, a drag and drop, a flick, or a swipe.

According to an embodiment of the present disclosure, successive motions of a touch includes a plurality of touches, and the description above of three touch locations 300a to 300c is one embodiment of the present disclosure, but the present disclosure is not limited thereto. The number of touches included in successive motions of a touch may vary.

When successive motions of the first touch 300 initiated from the inactive area A2 are detected, the controller 110 may enable the edge panel 320 to be exposed from edges 190b2 or 190c2 of the edge display areas 190b or 190c.

When successive motions of the first touch 300 initiated from the inactive area A2 are detected, the controller 110 may move the third application screen 220 according to the moving direction of the first touch 300. The controller 110 may display the edge panel 320 in a space generated by the movement of the third application screen 220.

The controller 110 may enable the edge panel 320 to be exposed (for example, moving) according to the moving distance of successive motions of the first touch. For example, the controller 110 may enable the exposed area of the edge panel 320 to increase (for example, there is a difference in the exposed area of the edge panel 320 in FIGS. 5I and 5J) as the moving distance of successive motions of the first touch is greater. Further, the controller 110 may display the exposed area of the third application screen 220 (for example, FIG. 5G) as decreased, in response to the increase of the exposed area of the edge panel 320.

When the edge panel 320 is completely displayed according to the moving distance of successive motions of the first touch, the controller 110 may complete (for example, display only without further movement) the movement of the edge panel 320.

When the movement of the edge panel 320 is completed and successive motions of the first touch continue, the controller 110 may display the second application screen 210 between the third application screen 220 in motion and the fixed edge panel 320.

When the movement of the edge panel 320 is completed and successive motions of the first touch continue, the controller 110 may display, between the third application driver 220 and the fixed edge panel 320, the second application screen 210 located under the third application screen 220.

When the movement of the edge panel 320 is completed and successive motions of the first touch continue (for example, arriving at another edge display area), the controller 110 may display the second application screen 210 and the fixed edge panel 320. When the movement of the edge panel 320 is completed and successive motions of the first touch continue (for example, arriving at another edge display area), the controller 110 may not display the third application screen 220.

The controller 110 may provide feedback corresponding to the display of the edge panel 320 to a user.

The feedback may be provided as one of visual feedback, audible feedback, and tactile feedback. Further, the controller 110 may provide a combination of visual feedback, audible feedback, and tactile feedback to a user.

In step S480 of FIG. 4, the feedback corresponding to the display of the edge panel 320 is substantially similar (for example, difference in touches) to the feedback corresponding to the display of the application drawer 310 in step S460 of FIG. 4, and a description thereof is thus omitted.

In step S480 of FIG. 4, if the controller 110 displays the edge panel 320, the screen display method of a portable device 100 is terminated.

The methods according to embodiments of the present disclosure may be in a form of program commands executed through various computer means to be recorded in a non-transitory computer-readable medium. The non-transitory computer-readable medium may include a program command, a data file, a data structure, and the like independently or in combination. The non-transitory computer-readable medium may be stored, for example, in a volatile or non-volatile storage device such as a ROM, a memory such as a RAM, a memory integrated circuit (IC) or chip, a memory device, a memory IC, or a storage medium that is optically or magnetically recordable and simultaneously machine (for example, computer)-readable, such as a compact disc (CD), a digital versatile disc (DVD), a magnetic disk, or a magnetic tape, regardless of its ability to be erased or re-recorded.

It is appreciated that the storage unit included in the portable device 100 is one example of non-transitory machine-readable storage media suitable for storing a program or programs including commands for implementing various embodiments of the present disclosure. Program commands recorded in the medium may be those specially designed and configured for the present disclosure, or those that are well known to and may be used by those skilled in the computer software related art.

Although the present disclosure has been described above with respect to the embodiments and the accompanying drawings, the present disclosure is not intended to be limited to the aforementioned embodiments, and various modifications and alterations may be made in light of the descriptions by those skilled in the art to which the present disclosure pertains.

Accordingly, the scope of the present disclosure should not be determined by the above-described embodiments, but should be determined by the appended claims and their equivalents.

What is claimed is:
1. A portable device, comprising:
an edge touch screen that has a main display area, has a left edge display area and a right edge display area which are individually extended from and curved with respect to the main display area; and
a processor configured to control the edge touch screen to:

in response to a first user input for executing a first application, display a first application screen corresponding to the first application in the main display area of the edge touch screen, in response to a second user input for executing a second application, display a second application screen corresponding to the second application in the main display area and a part of the first application screen in the left edge display area or the right edge display area such that the first application screen disappears from the main display area, and in response to a third user input from a predetermined area of the left edge display area or the right edge display area toward the main display area while the second application screen is displayed in the main display area and the part of the first application screen is displayed in the left edge display area or the right edge display area, display a part of the second application screen and another part of the first application screen in the main display area.

2. The device of claim 1, wherein the processor is further configured to perform a control such that an area of the second application screen is less than an area of the first application screen while the second application screen is displayed in the main display area and the part of the first application screen is displayed in the left edge display area or the right edge display area.

3. The device of claim 1, wherein the processor is further configured to, in response to receiving a third user input for executing a third application, control a third application screen corresponding to the third application to be displayed on the edge touch screen, and control a first part of the second application screen and a first part of the first application screen to be displayed in the left edge display area or the right edge display area.

4. The device of claim 3, wherein the processor is further configured to perform a control such that the second application screen is located on the first application screen, and control the third application screen is located on the second application screen.

5. The device of claim 3, wherein the processor is further configured to perform a control such that an area of the first application screen and an area of the second application screen are less than an area of the third application screen while the third application screen is displayed in the main display area and the first part of the first application screen and the first part of the second application screen are displayed in the left edge display area or the right edge display area.

6. The device of claim 3, wherein the processor is further configured to perform a control such that in response to successive motions of a first touch from an active area of the left edge display area or the right edge display area to the main display area are detected, an application drawer corresponding to the successive motions of the first touch is displayed.

7. The device of claim 6, wherein the processor is further configured to control the application drawer to be exposed in a direction from an edge of the left edge display area or the right edge display area in which the first touch is detected towards a moving direction of the successive motions of the first touch.

8. The device of claim 6, wherein the processor is further configured to control the application drawer to be further exposed in response to a moving distance of the successive motions of the first touch.

9. The device of claim 6, wherein the processor is further configured to perform a control such that the third application screen and the application drawer are displayed overlapping, and only the application drawer moves in a moving direction of the successive motions of the first touch in response to a moving distance of the successive motions of the first touch.

10. The device of claim 3, wherein the predetermined area is an inactive area of the left edge display area or the right edge display area, and wherein the processor is further configured to perform a control such that in response to successive motions of a second touch from the inactive area of the left edge display area or the right edge display area to the main display area are detected, an edge panel corresponding to the successive motions of the second touch is displayed.

11. The device of claim 10, wherein the processor is further configured to control the edge panel to be exposed in a direction from an edge of the left edge display area or the right edge display area in which the second touch is detected towards a moving direction of the successive motions of the second touch.

12. The device of claim 10, wherein the processor is further configured to control the edge panel and the third application screen to move in a moving direction of the successive motions of the second touch.

13. The device of claim 10, wherein the processor is further configured to perform a control such that an exposed area of the edge panel is increased or decreased in response to a moving distance of the successive motions of the second touch.

14. The device of claim 10, wherein if moving of the edge panel is completed in response to the successive motions of the second touch and the third application screen continuously moves, the processor is further configured to perform a control such that a second part of the second application screen is displayed between the third application screen and the edge panel.

15. A screen display method of a portable device, comprising:

detecting, by the portable device, a first user input in an edge touch screen that has a main display area, has a left edge display area and a right edge display area which are individually extended from and curved with respect to the main display area, and displays an application screen thereon;

in response to a first user input for executing a first application, displaying, by the portable device, a first application screen corresponding to the first application in the main display area of the edge touch screen;

detecting, by the portable device, a second user input;

in response to the second user input for executing a second application, displaying, by the portable device, a second application screen corresponding to the second application in the main display area of the edge touch screen and a part of the first application screen in the left edge display area or the right edge display area such that the first application screen disappears from the main display area, and in response to a third user input from a predetermined area of the left edge display area or the right edge display area toward the main display area while the second application screen is displayed in the main display area and the part of the first application screen is displayed in the left edge display area or the right edge display area, displaying a part of the second application screen and another part of the first application screen in the main display area.

16. The method of claim 15, further comprising:

detecting a third user input for executing a third application; and displaying a third application screen corresponding to the third application in the main display area of the edge touch screen, wherein a first part of the first application screen and a first part of the second application screen are displayed in the left edge display area or the right edge display area in response to displaying the third application screen in the main display area.

17. The method of claim 16, further comprising:

detecting successive motions of a first touch from an active area of the left edge display area or the right edge display area to the main display area; and displaying an application drawer corresponding to the successive motions of the first touch, wherein the third application screen and the application drawer are displayed overlapping.

18. The method of claim 17, further comprising:

detecting successive motions of a second touch from an active area of the left edge display area or the right edge display area to the main display area; and displaying an edge panel corresponding to the successive motions of the second touch, wherein the third application screen and the application drawer are moved together in response to the successive motions of the second touch.

19. The method of claim 18, wherein a second part of the second application screen is displayed between the third application screen and the application drawer in response to the successive motions of the second touch.

* * * * *